INVENTORS.
JAMES G. BARCOMB
FREDERICK W. SCHAAF

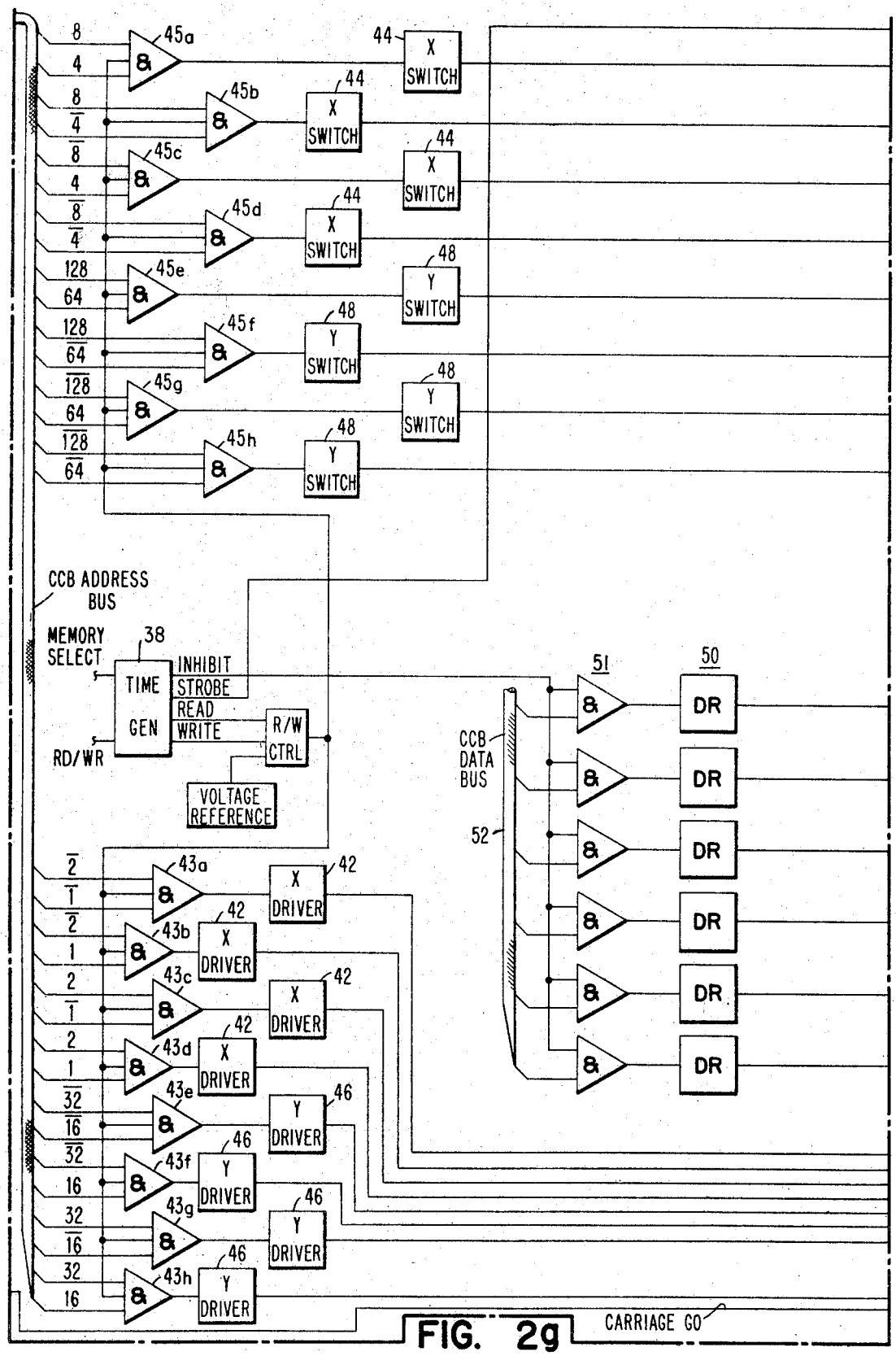

| FIG.2a | FIG.2b | FIG.2c | FIG.2d | FIG.2e | FIG.2f | FIG.2g | FIG.2h | FIG.2i | FIG.2j |
|---|---|---|---|---|---|---|---|---|---|
| FIG.2k | FIG.2l | FIG.2m | FIG.2n | FIG.2o | FIG.2p | FIG.2q | FIG.2r | FIG.2s | FIG.2t |

VALID CARRIAGE CONTROL BUFFER CODES
THE FOLLOWING CODES CONTAIN THE FLAG BIT FOR DEFINING
THE LAST LINE OF THE FORM

| CODE | BUS OUT BITS |
|---|---|
| | P 0 1 2 3 4 5 6 7 |
| SPACE | 0 0 0 0 1 0 0 0 0 |
| CHANNEL 1 | 1 0 0 0 1 0 0 0 1 |
| CHANNEL 2 | 1 0 0 0 1 0 0 1 0 |
| CHANNEL 3 | 0 0 0 0 1 0 0 1 1 |
| CHANNEL 4 | 1 0 0 0 1 0 1 0 0 |
| CHANNEL 5 | 0 0 0 0 1 0 1 0 1 |
| CHANNEL 6 | 0 0 0 0 1 0 1 1 0 |
| CHANNEL 7 | 1 0 0 0 1 0 1 1 1 |
| CHANNEL 8 | 1 0 0 0 1 1 0 0 0 |
| CHANNEL 9 | 0 0 0 0 1 1 0 0 1 |
| CHANNEL 10 | 0 0 0 0 1 1 0 1 0 |
| CHANNEL 11 | 1 0 0 0 1 1 0 1 1 |
| CHANNEL 12 | 0 0 0 0 1 1 1 0 0 |

NOTE: BIT 3 IS THE LAST LINE FLAG BIT

FIG. 4

THE FOLLOWING CODES ARE USED TO
DEFINE LINE POSITIONS OTHER THAN
THE LAST LINE OF THE FORM

| CODE | BUS OUT BITS |
|---|---|
| | P 0 1 2 3 4 5 6 7 |
| SPACE | 1 0 0 0 0 0 0 0 0 |
| CHANNEL 1 | 0 0 0 0 0 0 0 0 1 |
| CHANNEL 2 | 0 0 0 0 0 0 0 1 0 |
| CHANNEL 3 | 1 0 0 0 0 0 0 1 1 |
| CHANNEL 4 | 0 0 0 0 0 0 1 0 0 |
| CHANNEL 5 | 1 0 0 0 0 0 1 0 1 |
| CHANNEL 6 | 1 0 0 0 0 0 1 1 0 |
| CHANNEL 7 | 0 0 0 0 0 0 1 1 1 |
| CHANNEL 8 | 0 0 0 0 0 1 0 0 0 |
| CHANNEL 9 | 1 0 0 0 0 1 0 0 1 |
| CHANNEL 10 | 1 0 0 0 0 1 0 1 0 |
| CHANNEL 11 | 0 0 0 0 0 1 0 1 1 |
| CHANNEL 12 | 1 0 0 0 0 1 1 0 0 |

FIG. 5

| COMMAND | BUS OUT BITS |
|---|---|
| | P 0 1 2 3 4 5 6 7 |
| TEST I/O | 1 0 0 0 0 0 0 0 0 |
| SENSE | 0 0 0 0 0 0 1 0 0 |
| WRITE WITHOUT SPACING | 0 0 0 0 0 0 0 0 1 |
| WRITE AND SPACE 1 | 1 0 0 0 0 1 0 0 1 |
| WRITE AND SPACE 2 | 1 0 0 0 1 0 0 0 1 |
| WRITE AND SPACE 3 | 0 0 0 0 1 1 0 0 1 |
| WRITE AND SKIP TO CHAN 1 | 0 1 0 0 0 1 0 0 1 |
| WRITE AND SKIP TO CHAN 2 | 0 1 0 0 1 0 0 0 1 |
| WRITE AND SKIP TO CHAN 3 | 1 1 0 0 1 1 0 0 1 |
| WRITE AND SKIP TO CHAN 4 | 0 1 0 1 0 0 0 0 1 |
| WRITE AND SKIP TO CHAN 5 | 1 1 0 1 0 1 0 0 1 |
| WRITE AND SKIP TO CHAN 6 | 1 1 0 1 1 0 0 0 1 |
| WRITE AND SKIP TO CHAN 7 | 0 1 0 1 1 1 0 0 1 |
| WRITE AND SKIP TO CHAN 8 | 0 1 1 0 0 0 0 0 1 |
| WRITE AND SKIP TO CHAN 9 | 1 1 1 0 0 1 0 0 1 |
| WRITE AND SKIP TO CHAN 10 | 1 1 1 0 1 0 0 0 1 |
| WRITE AND SKIP TO CHAN 11 | 0 1 1 0 1 1 0 0 1 |
| WRITE AND SKIP TO CHAN 12 | 1 1 1 1 0 0 0 0 1 |

| COMMAND | BUS OUT BITS |
|---|---|
| | P 0 1 2 3 4 5 6 7 |
| NO OP | 1 0 0 0 0 0 0 1 1 |
| SPACE 1 IMMEDIATE | 0 0 0 0 0 1 0 1 1 |
| SPACE 2 IMMEDIATE | 0 0 0 0 1 0 0 1 1 |
| SPACE 3 IMMEDIATE | 1 0 0 0 1 1 0 1 1 |
| SKIP IMMEDIATE TO CHAN 1 | 1 1 0 0 0 1 0 1 1 |
| SKIP IMMEDIATE TO CHAN 2 | 1 1 0 0 1 0 0 1 1 |
| SKIP IMMEDIATE TO CHAN 3 | 0 1 0 0 1 1 0 1 1 |
| SKIP IMMEDIATE TO CHAN 4 | 1 1 0 1 0 0 0 1 1 |
| SKIP IMMEDIATE TO CHAN 5 | 0 1 0 1 0 1 0 1 1 |
| SKIP IMMEDIATE TO CHAN 6 | 0 1 0 1 1 0 0 1 1 |
| SKIP IMMEDIATE TO CHAN 7 | 1 1 0 1 1 1 0 1 1 |
| SKIP IMMEDIATE TO CHAN 8 | 1 1 1 0 0 0 0 1 1 |
| SKIP IMMEDIATE TO CHAN 9 | 0 1 1 0 0 1 0 1 1 |
| SKIP IMMEDIATE TO CHAN 10 | 0 1 1 0 1 0 0 1 1 |
| SKIP IMMEDIATE TO CHAN 11 | 1 1 1 0 1 1 0 1 1 |
| SKIP IMMEDIATE TO CHAN 12 | 0 1 1 1 0 0 0 1 1 |

3,511,354
FORMS VELOCITY CONTROL FOR PRINTERS
James G. Barcomb, Endwell, and Frederick W. Schaaf,
  Owego, N.Y., assignors to International Business
  Machines Corporation, Armonk, N.Y., a corporation
  of New York
Filed Dec. 21, 1967, Ser. No. 692,338
Int. Cl. B41j *15/00*
U.S. Cl. 197—133    3 Claims

ABSTRACT OF THE DISCLOSURE

In a multi-speed carriage drive for a printer, control of a high speed latch is effected by a forms velocity control circuit which turns off a high speed latch whenever operation of the printer carriage at the high speed occurs for a long enough time to provide such an excess of forms between the forms tractor and the stacker feed rolls that a forms jam is imminent.

Cross-reference to related applications

This invention is related to the inventions of copending applications Ser. Nos. 661,929 of Frederick W. Schaaf and 661,930 of Roger C. Hull and Eugene T. Kozol, filed Aug. 21, 1967 and is shown applied to a system utilizing the circuits thereof.

Field of invention

This invention relates to multi-speed carriage printers which have substantially constant speed forms feed rolls for feeding a continuous form to a stacker.

Description of prior art

Heretofore the maximum speed of a printer carriage has either been determined by limiting the top speed to a safe stacking speed or by using a forms jam detection system which either warns the operator that queuing of the forms presents an imminent jam problem or stops the printer.

Summary of the invention

Generally stated, it is an object of this invention to provide an improved forms feed control system for printers and in particular for high speed printers.

More specifically, it is an object of the present invention to provide for so controlling the operating speed of a printer carriage as to prevent the accumulation of an excess of forms between the forms tractor and the stacker feed rolls to such an extent that a forms jam is imminent.

Another object of the invention is to provide a forms control circuit in which a capacitor is charged at different rates which are proportional to the different operating speeds of the printer forms feed tractor and is discharged at a rate which is proportional to the speed of the stacker feed rolls, and for operating switch means to reduce the speed of the tractor whenever the charge on the capacitor reaches a level which indicates that more than a safe amount of excess forms exists between the feed rolls and the tractor.

Yet another object of the invention is to provide a control circuit which is operable in response to a predetermined storage level in a storage device controlled by the difference between tractor speed and the stacker feed rate for limiting operation of a forms feed tractor in a printer at a high speed to prevent excessive queuing of the form between the tractor and the stacker.

It is also an object of this invention to prevent a forms tractor in a high speed printer from operating at a high speed for longer than a safe period in which the excess of the form between the tractor and the stacker feed rolls reaches a maximum safe value.

An important object of the invention is to permit the operation of a forms feed tractor in a high speed printer at as high a speed as is possible without permitting the accumulation of an unsafe excess of forms between the feed tractor and the stacker feed rolls.

In a preferred form of the invention, a capacitor is provided with a discharge circuit which discharges the capacitor at a rate which is proportional to the rate at which a pair of constant speed feed rolls feed the forms from a printer to a stacker. Several charging circuits are provided which are proportioned to charge the capacitor at rates corresponding to the several different speeds at which the printer forms feed tractor runs. They are selectively connected to charge the capacitor whenever the tractor is operating at the corresponding speed. A switch is operated to reduce the speed of the tractor whenever the voltage of the capacitor reaches a predetermined level indicative that an excess of forms queued between the tractor and the stacker is such that a forms jam is imminent.

The foregoing and other objects, features and advantages of the invention will be apparent from the following more particular description of a preferred embodiment of the invention as illustrated in the accompanying drawing.

Description of the drawing

In the drawing:

FIG. 4 is a chart showing typical carriage control codes;

FIG. 5 is a chart showing typical codes to define line positions other than the last line of a form;

FIGS. 6a through 6b are charts showing valid commands for control of a printer carriage utilizing the invention;

Description of preferred embodiment

Figure 1:
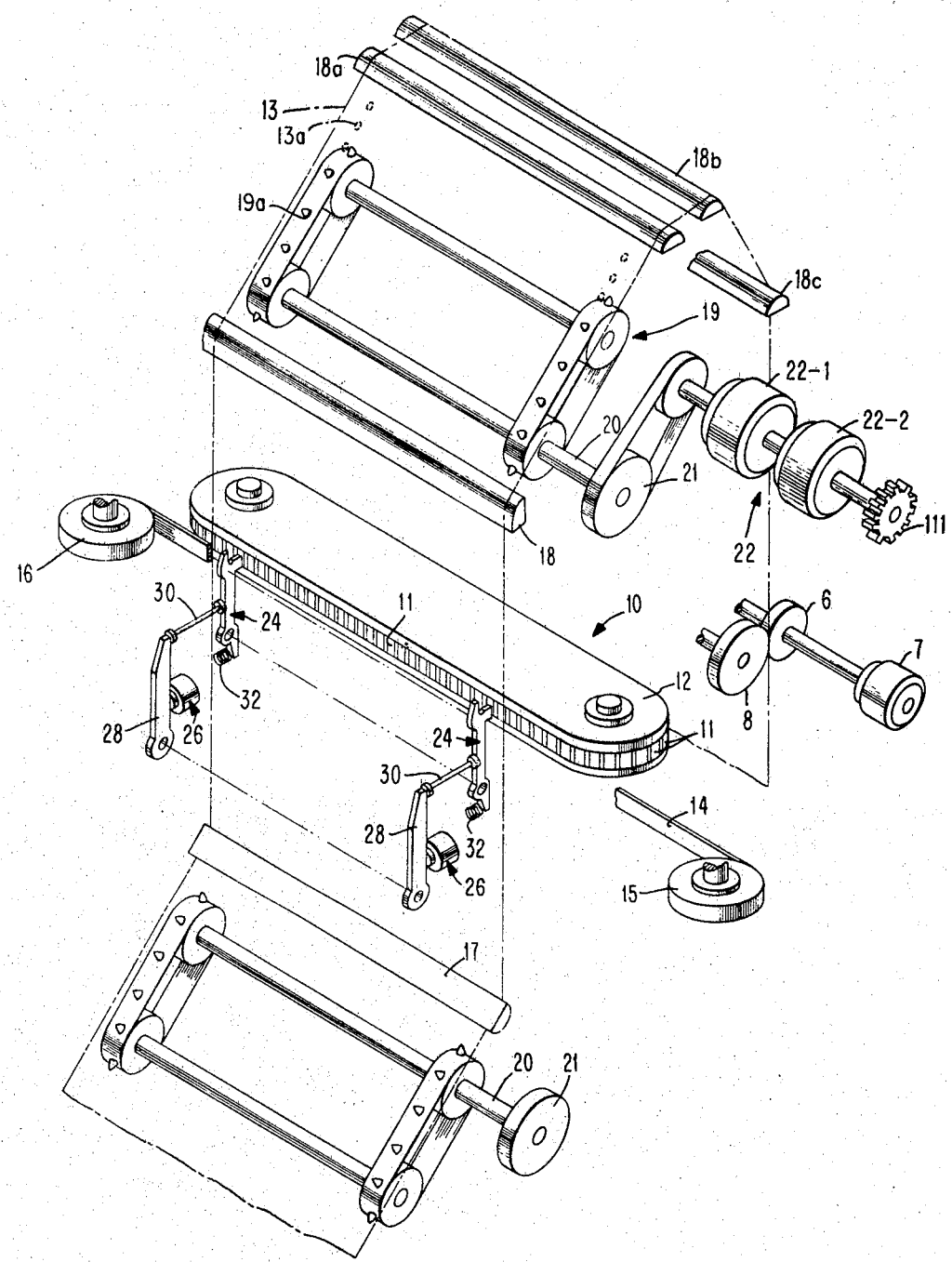
FIG. 1 is a schematic showing in part of one type of printer apparatus with which the invention may be used.

FIG. 1 shows a printer apparatus of one type with which the present invention may be used, and comprises a type carrier 10 having a plurality of individual type elements 11 movable in a continuous path on a stationary frame 12. A portion of the path of motion of the type elements 11 includes a straight portion along which printing can occur and which hereinafter is referred to as the print line. Each type element 11 has one or more different engraved characters on the surface thereof adjacent the print line. Plural sequences of type characters are obtained by assembling the type elements 11 in predetermined arrangements on the frame 12. The type elements 11 are driven preferably in the form of a train along the frame 12 so that they travel at a constant velocity and are maintained in abutting relation along the straight portion of the path of travel.

The printer apparatus of FIG. 1 is a back printer which is described in U.S. Pat. 3,241,480 which issued on Mar. 22, 1966 to James M. Cunningham, and in accordance with well-known operational principles thereof a paper document or form 13 is positioned behind an ink ribbon 14 or the like which in turn is positioned immediately adjacent the type elements 11 over the print line portion thereof. The ribbon 14 may be fed in a suitable manner between spools 15 and 16 along the line of travel of the type elements 11. The paper document 13, however, is fed transversely to the direction of motion of the type. Guide bars 17 and 18, 18a, 18b and 18c and carriage forms feed tractors 19 co-act to support and move the paper document 13 on the proper line of travel. Generally printing occurs while the paper 13 is stationary relative to the print line. On completion of a print cycle, the paper document 13 is advanced one or more spaces by the carriage tractors 19 having positive feed by means of pins 19a which fit in perforations 13a of the document 13, to a position where a new line of data may be printed. The means for feeding the paper document 13 in synchronism with operation of the print mechanism are well known in the art and may include a carriage drive motor 22 comprising for example, dual motor units 22–1 and 22–2 or the like connected to shafts 20 by means of pulleys 21 or the like of the carriage tractors 19. Means such as a stacker feed roll 6 driven by a constant speed motor 7 may be used in conjunction with a pressure roll 8 for feeding the document 13 to a stacker or the like (not shown). In the printer apparatus of FIG. 1 the arrangement shown is for a back printer. This arrangement is merely used by way of example and not by way of limitation, since the invention may be as readily used with a front printer. As shown, printing occurs when the paper 13 and ribbon 14 are impacted against the type characters on the type elements 11. The impacting occurs at various print positions along the print line to eventually form a complete line of data. For this purpose, a plurality of print hammers 24 are mounted behind the print medium 13. Print hammers 24 are arranged to be uniformly spaced so that one hammer 24 occupies each print position along the print line, and the hammers 24 are aligned in a single row parallel to the print line. Each print hammer 24 is a part of an individual hammer unit which comprises an electromagnet 26 with an armature 28 and a push rod connector element 30 with bias springs 32 which maintain the hammers 24 out of contact with the paper 13 when the electromagnet 26 is de-energized. Each hammer 24 is individually operable and the operation of the various hammers 24 occurs selectively at random positions along the print line in accordance with instructions from control means which comprises a type tracking device and a co-acting storage device which indicates the particular data to be printed. Further details of a suitable control system may be more fully understood by reference to U.S. Pat. No. 2,993,437 of F. M. Demer and E. J. Grenchus for a High Speed Printer, which issued July 25, 1961.

Heretofore, control of the tractor drive means 22 for advancing the paper 13 to the different line positions at which printing is desired had been controlled by means such as described in U.S. Pat. No. 2,531,885 to A. W. Mills et al., which issued on Nov. 28, 1950, and is entitled, "Paper Feeding Device."

As therein described, control of the document feed was obtained by using a paper tape having a plurality of channels in which holes were punched at the particular line positions to which a skip operation was to be effected. A plurality of brushes aligned with these channels sensed the holes punched therein, and under the control of channel selecting commands from a processing unit, effected stopping of the document at the desired line positions.

As described in the co-pending application of Frederick W. Schaaf, Ser. No. 661,929, filed Aug. 21, 1967, entitled "Tapeless Carriage Control," that invention provides for replacing the punched paper tape control system and its sensing brushes with a carriage control buffer 40 wherein are stored binary coded representations of the channels containing the different skip commands, these representations being stored at the respective line positions to which skip operation is to be effected.

Figure 2A:
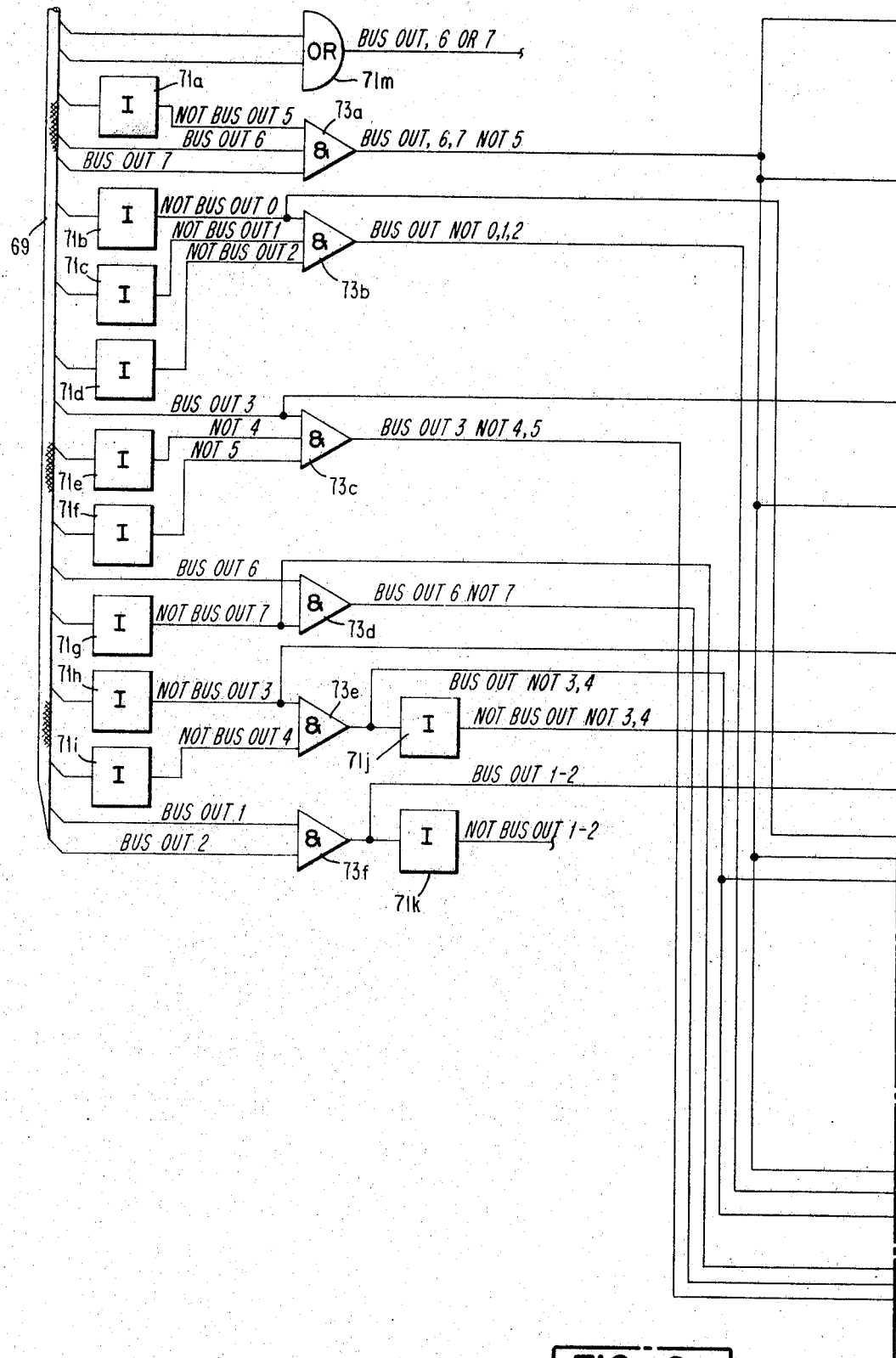
FIGS. 2a through 2t taken together provide a schematic diagram of a tapeless carriage control system which may be used with the carriage of FIG. 1 and has a stepping motor drive which embodies the invention in one of its forms.
Figure 2B:
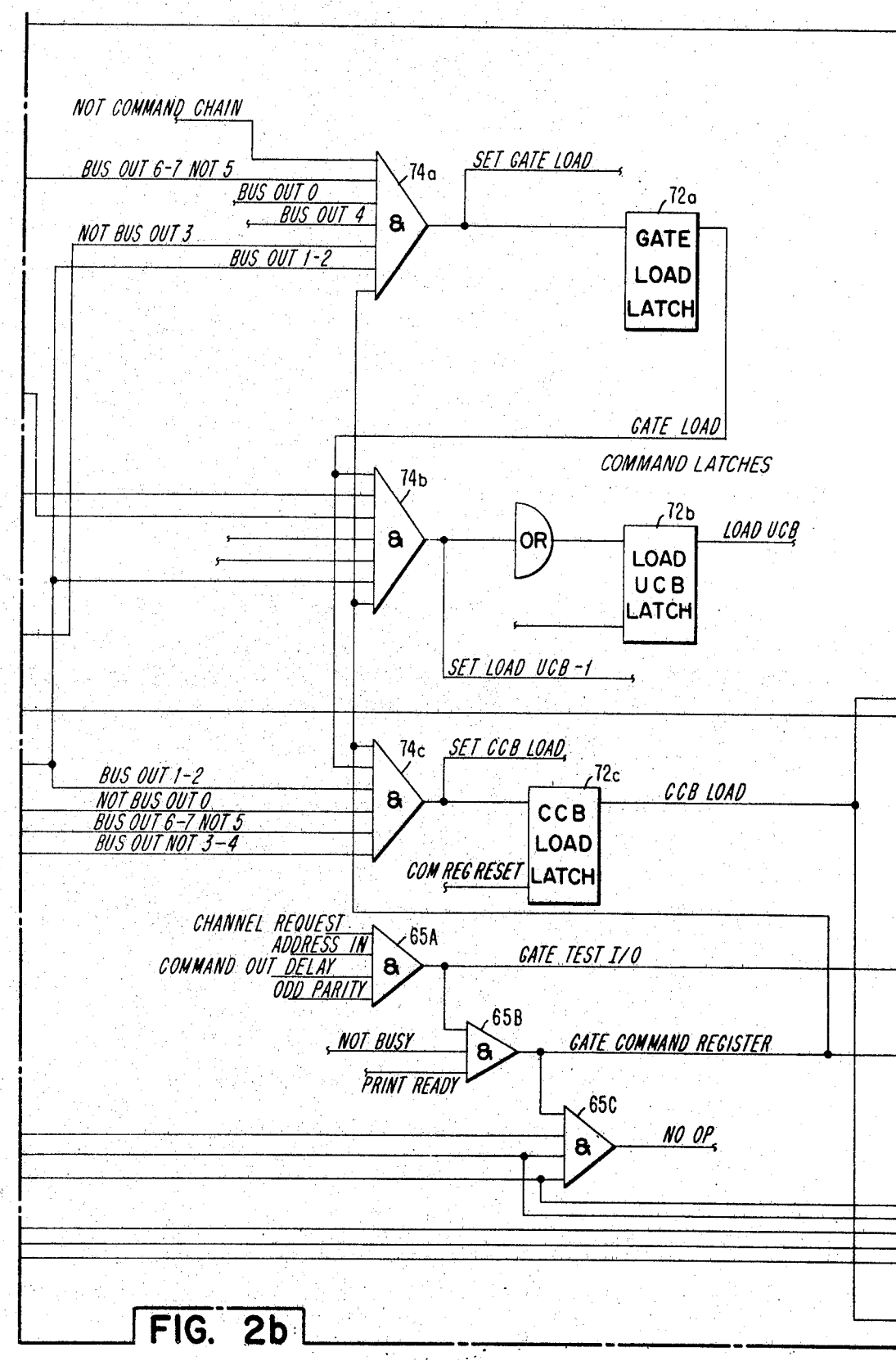
Figure 2C:
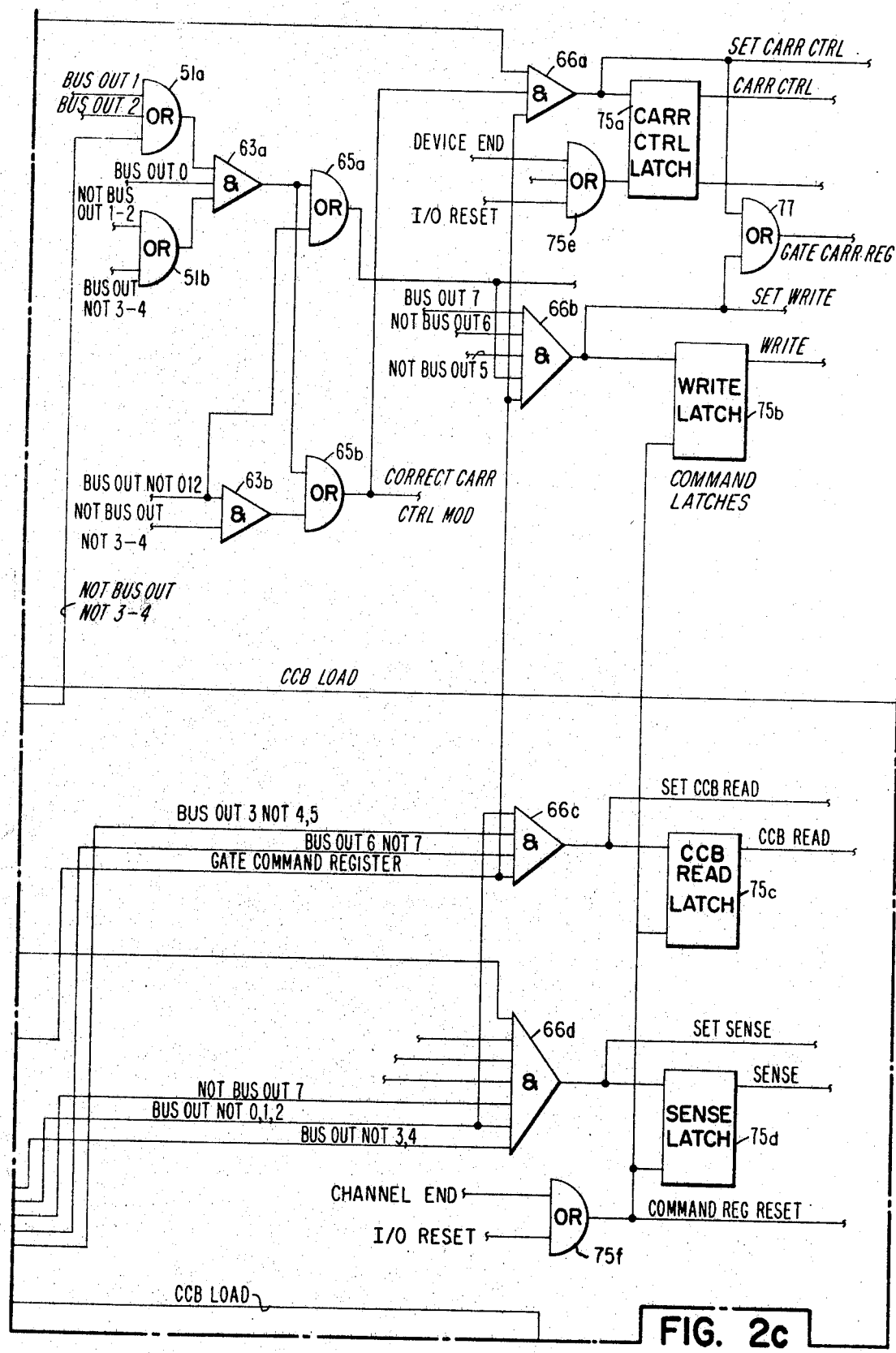

The Carriage Control Buffer 40 in the Schaaf application is a 16 x 16 core array containing 256 bytes, with core planes for an end of document Flag bit, 1, 2, 4, and 8 bits and a parity bit. As shown in FIGS. 2g and 2h, the buffer 40 is provided with a plurality of X drivers 42 and corresponding X switches 44 for providing drive current in the X direction. Y drivers 46 and Y switches 48 provide the corresponding Y drive. Inhibit drivers 50 and AND gates 51 are provided for selectively controlling the writing of information into the buffer 40 in response to data on the Carriage Control Buffer data bus 52. Sense amplifiers 54 and ANDs 55 provide for readout of the buffer 40, Flag, 1, 2, 4, 8 and P bit lines of the several core planes.

Figure 2D:
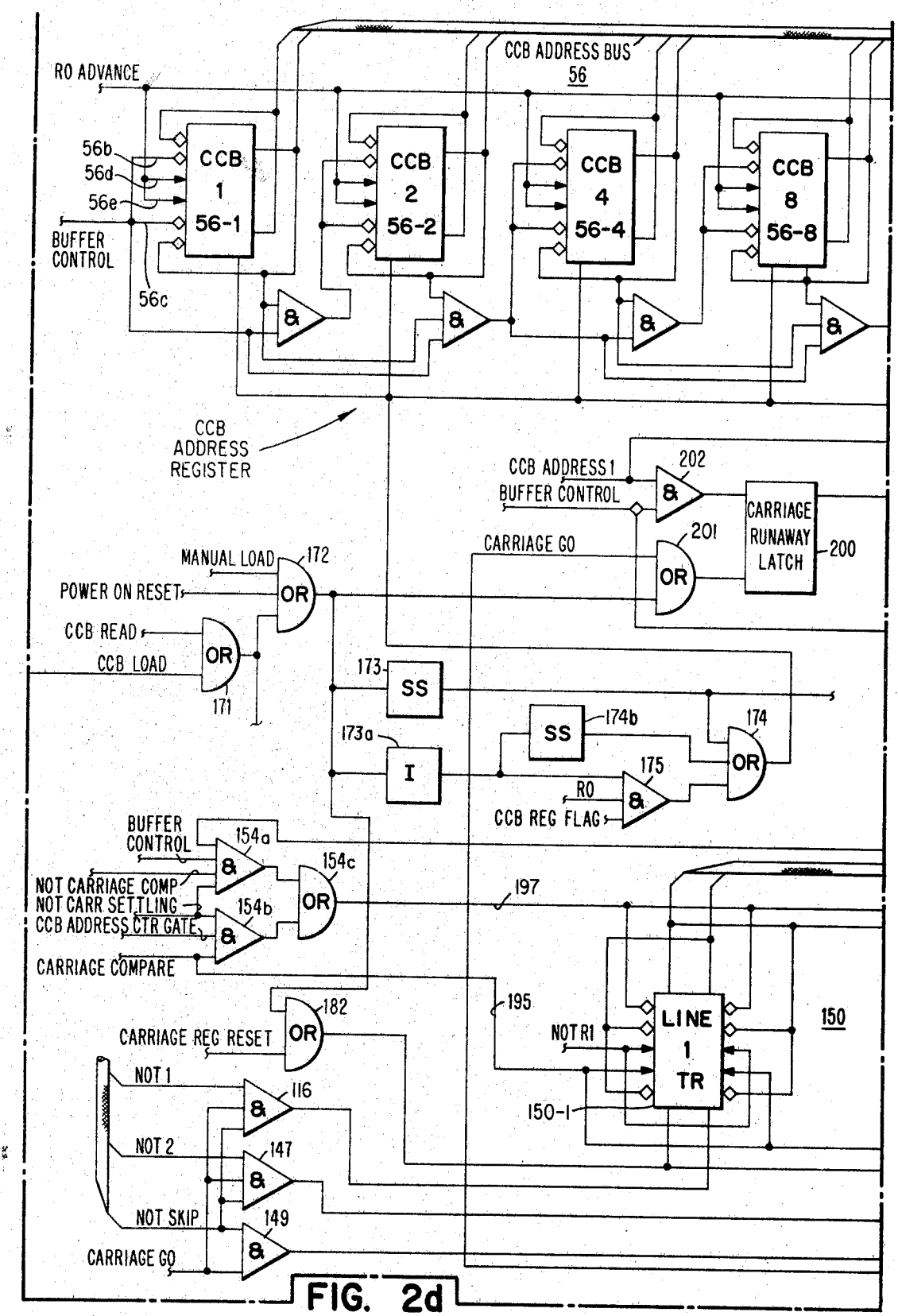
Figure 2E:
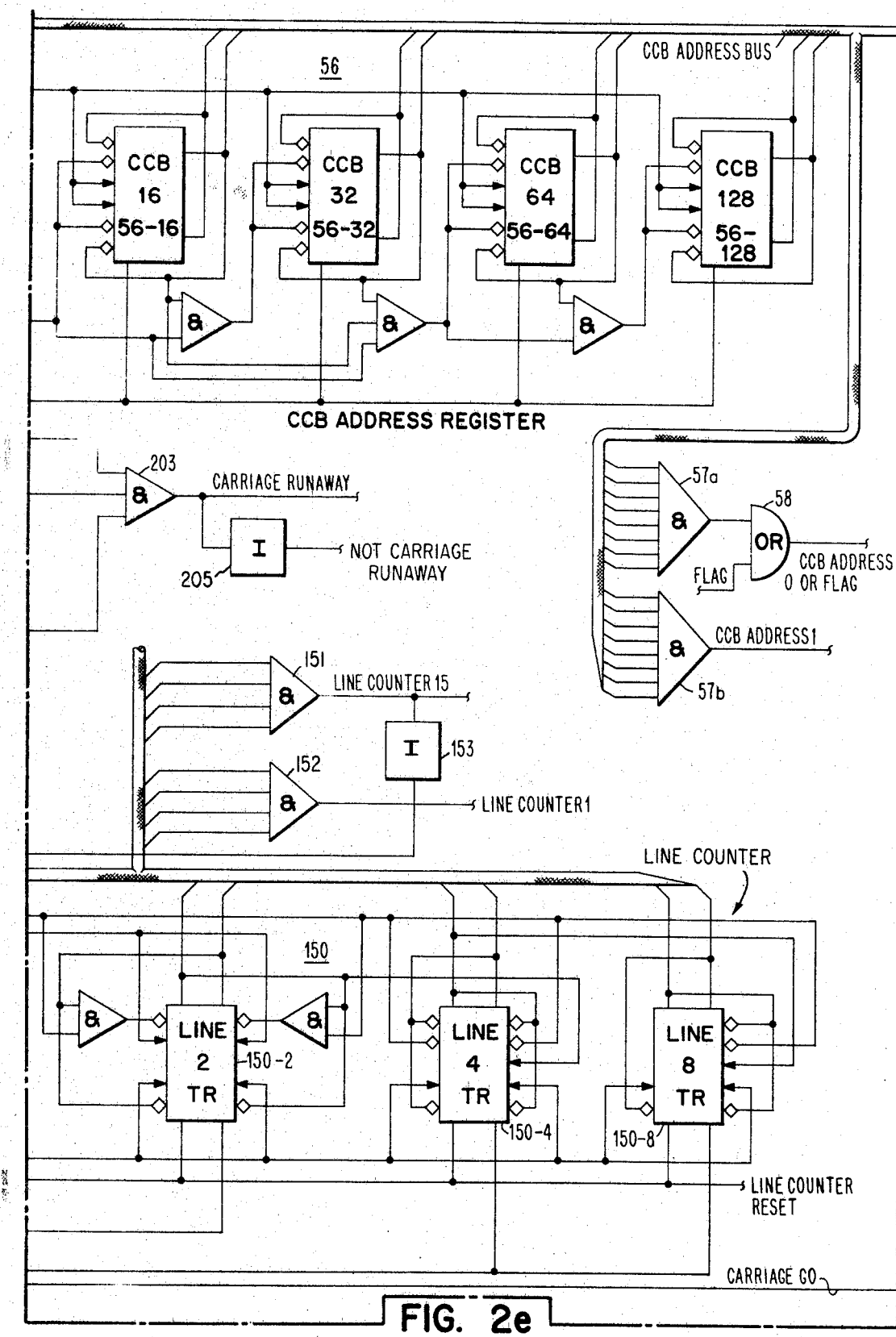
Figure 2F:
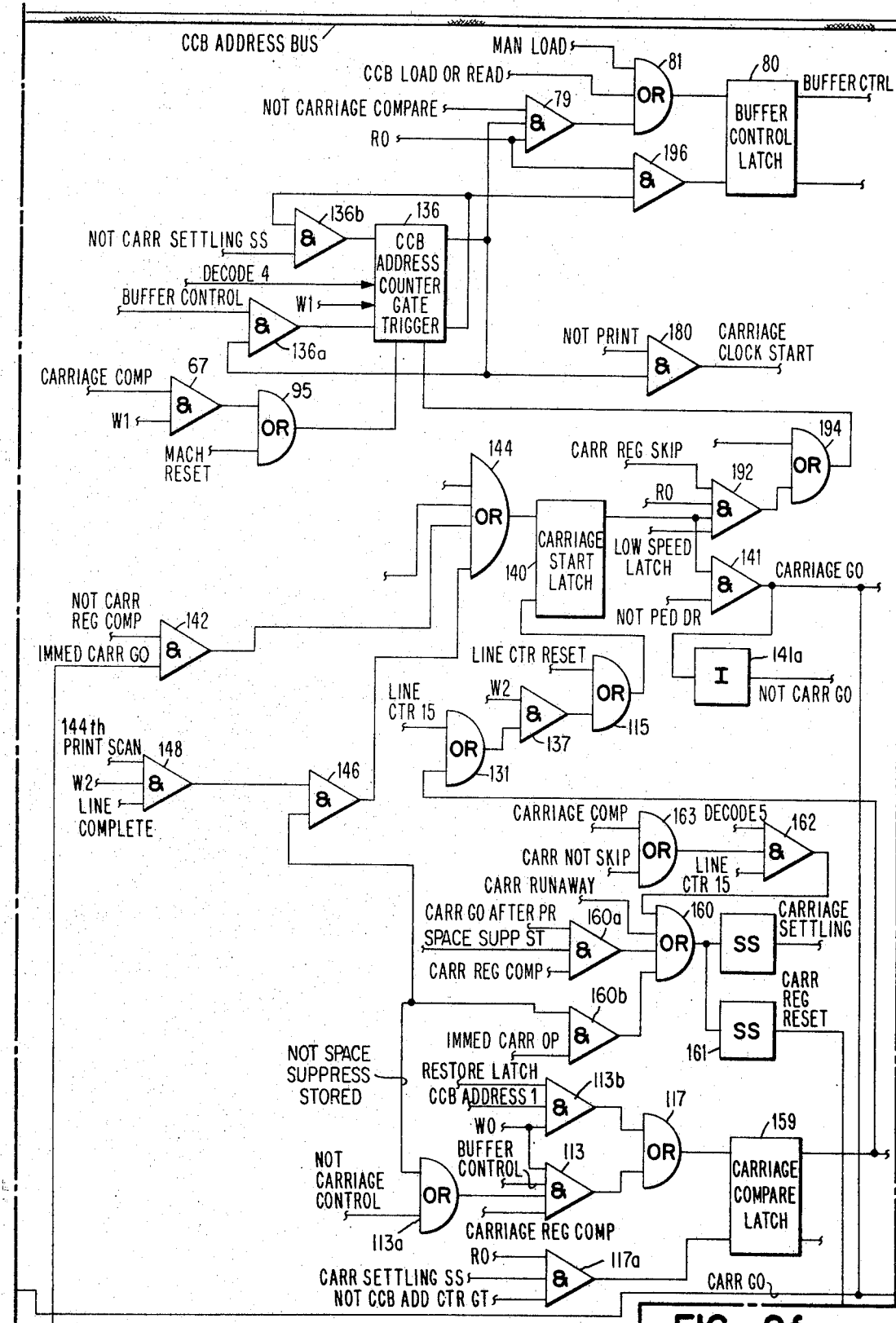
Figure 2H:
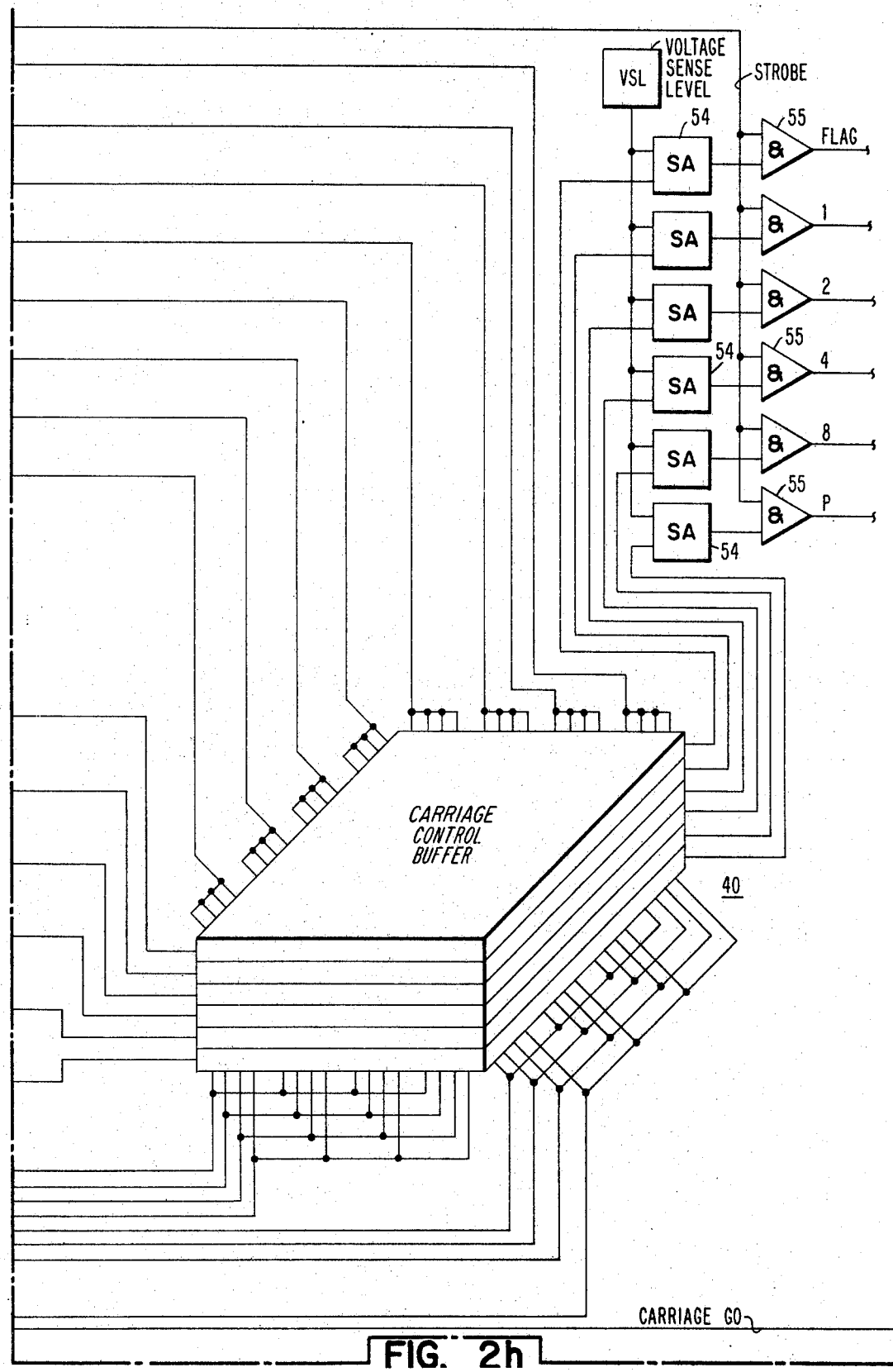

Addressing of the buffer 40 is effected by means of a CCB Address Register 56 shown in FIGS. 2d and 2e, and in which comprises a plurality of triggers 56–1, 56–2, 56–4, through 56–128 arranged in a binary addressing fashion for addressing of the buffer 40. Triggers 56–1 and 56–2 are decoded by ANDs 43a–43d (FIG. 2g) to form unique output lines for controlling the X drivers 42, while triggers 56–4 and 56–8 are similarly decoded by ANDs 45a–45d to control the X switches 44. Likewise, triggers 56–16 and 56–32 address the Y drivers 46 through ANDs 43e–43h while triggers 56–64 and 56–128 address the Y switches 48 through ANDs 45e–45h. The Address Register 56 is advanced by pulses from a clock 60 shown in FIGS. 2i and 2j, and which comprises a plurality of triggers 60–1 through 60–4 and decode ANDs 61a–61k with associated inverters 63a–d single shots 63e–f, and drivers 63g–i. Drive of the clock triggers 60–1 through 60–4 is obtained from a Clock Run trigger 62 through AND 64 in conjunction with pulses from oscillator 36. The trigger 62 is set through AND 68 and OR 70 by an Adapter Start signal from OR 84 (FIG. 2n) during loading of the buffer 40 and by a Carriage Clock Start signal from AND 180 (FIG. 2f) during readout of the buffer 40.

Figure 2I:
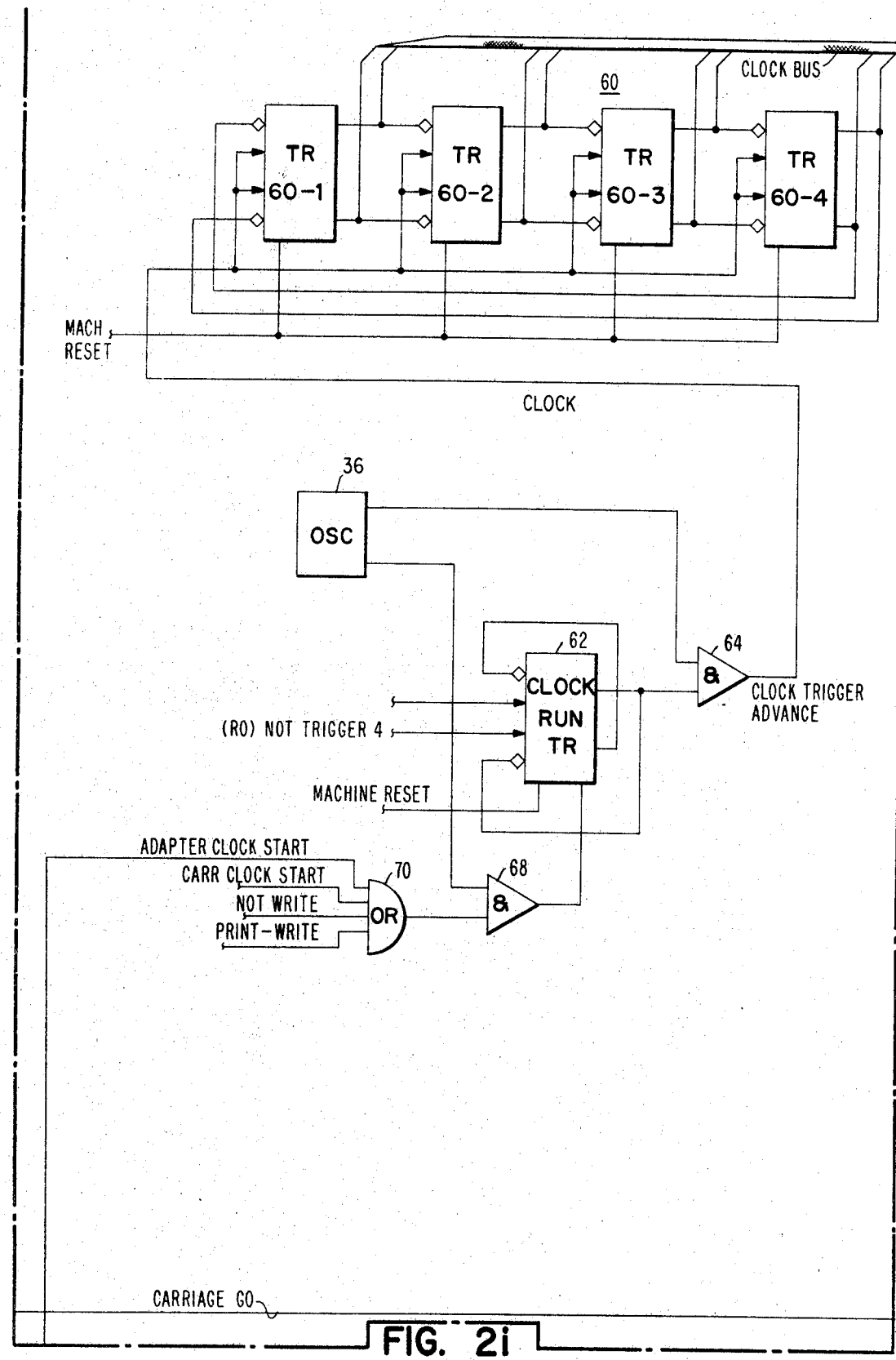
Figure 2J:
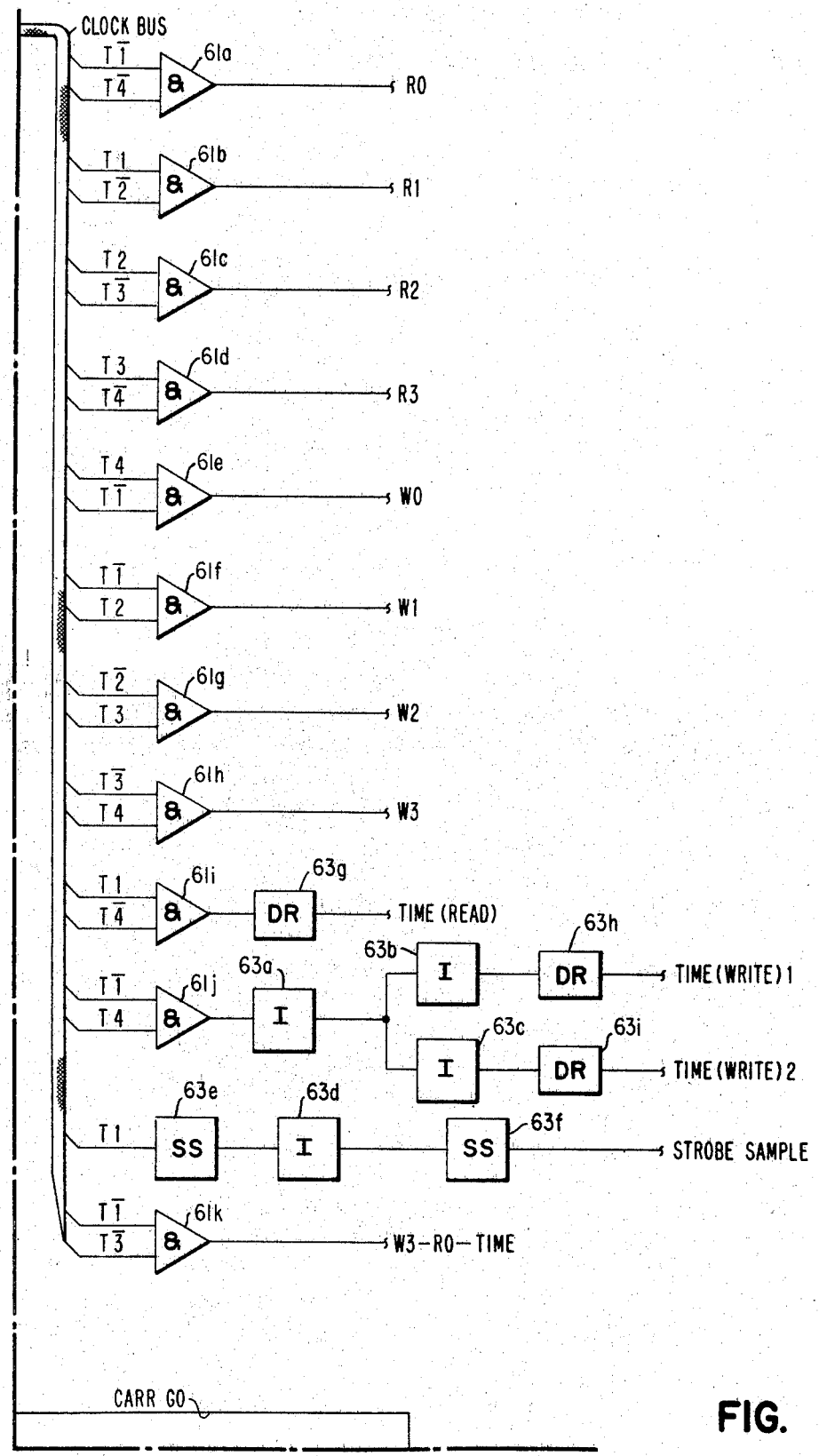

In order to avoid inadvertent modification of the Carriage Control Buffer contents, loading of the buffer 40 is effected in response to CCB Load command which follows a specific channel tag line sequence which is sensed and stored in a Gate Load latch 72a shown in FIG. 2b and which must be set before the CCB Load latch 72c can be set. An UCB Load latch 72b also shown, controls loading of a universal character buffer (not shown). These latches 72a–c respond to commands on the Bus Out lines 69 through decode ANDs 74a–74c, respectively. AND 59 and OR 47 provide an Invalid CCB Address 1 signal. Required NOT signals are obtained from the Bus Out lines 69 through Inverters 71a–k (FIG. 2a) and decode ANDs 73a–f. OR 71m provides a Bus Out 6 or 7 signal. Control of the CCB Address Register 56 during loading is effected by a Buffer Control latch 80, shown in FIG. 2f which is set by the CCB Load signal through OR 81 or by the output of AND 79. Data from the channel is loaded under the control of the I/O tag lines Service-In and Service-Out which gate signals from OR 38c and one of ORs 39a–c through AND 82 and OR 84 (FIG. 2n) which provides an adapter clock start signal for setting the clock trigger 62 (FIG. 2i). OR 39d provides an input to OR 84, while OR 39a also provides inputs to ORs 38a–c. Data is gated to a CCB register 83 (FIG. 2k) comprising a plurality of latches 83a–f for comparison through ORs 76a–h and ANDs 77a–c with command signals in a Command Register 78 (FIG. 2l), comprising latches 78a–e which are controlled from the Bus Out 69 through ORs 85a–f and decode ANDs 86a–k from the system Bus Out 69 with the following byte relations.

| Bus bit: | CCB register bit |
|---|---|
| 4 | 8 |
| 5 | 4 |
| 6 | 2 |
| 7 | 1 |
| 3 | F |

The data is gated to the register 83 by means of a plurality of ANDs 87a through 87l and ORs 88a–f to the latches 83a–f (FIG. 2k) and to the CCB data bus 52 for controlling the inhibit drivers 50 (FIG. 2g) for storing data bits in the several planes of the different positions in the buffer 40 of FIG. 2h. ANDs 87m and 87n (FIG. 2k) provide gating signals to different ones of the ANDs 87a–l for manual and normal operations, respectively. Exclusive ORs 89a–e, in conjunction with AND 89f, provide a parity bit for latch 83a. Reset of latches 83a–f is provided through AND 90.

Readout of the CCB Buffer 40 in connection with carriage operations may occur with or without printing. Operation of the carriage tractors 19 is effected in accordance with the Roger C. Hull et al. invention, referenced above by selectively energizing phase winding 22a, 22b, 22c and 22d, and 22A, 22B, 22C and 22D (FIG. 2t) of the carriage motors 22–1 and 22–2 of FIG. 1 which may comprise stepper motors of a well-known type, directly from and through a plurality of ANDs 94A, 94Ā, 94B and 94B̄, in response to energization of carriage stepping triggers 96A and 96B as shown in FIG. 2s. The ANDs 94A, 94Ā, 94B and 94B̄ serve to inhibit drive to the motor 22–2 when the pedestal drive signal from OR 191 (FIG. 2t) is removed by the Low Speed latch 120 being turned off, carriage counter trigger 130c (FIG. 2r) is off, and the delay from decode 8ss 193 (FIG. 2t) is complete. The triggers 96A and 96B are sequentially stepped in response to a Stepper Motor Advance signal from AND 98 through OR 100, in response to an Initial Advance from a single shot 102, or pulses from emitter means 118 comprising a plurality of emitter pickup heads 103, 104, and 106 associated with an emitter disc 111 having a plurality of peripheral teeth 111a driven by motor 22–1, 22–2 through amplifiers 108a–c, single shots 109a and 109b, and ANDs 110d–g (FIG. 2r). The outputs from the emitter heads 103–104–106 are gated by means of output signals from ANDs 112 and 114 from a Low Speed latch 120, a Medium High Speed latch 122, and/or High Speed latch 124 (FIG. 2t). Selective control of the Medium Speed latch 122 and High Speed latch 124 is effected through ANDs 121a–d, ORs 123k–q, and ANDs 123a–j by a Carriage Counter 130 (FIG. 2r) which counts individual motor advance pulses and comprises a plurality of triggers 130a–c advanced in a binary fashion by feedback pulses from the AND 98. Through a decode circuit of ANDs 132a–c the counter 130 provides decode 4, decode 5, and decode 7 output signals, respectively. The High Speed emitter signal is produced from the Medium Speed emitter head 106 by inverting it through inverter 105 to drive single shot 107. Stop pulses are provided through ANDs 110a–110c by stop circuits 133, 134, and 135, each of which comprises, as shown in circuit 133, a plurality of cascade arranged single shots 133a, b, c and d with associated inverters 133e and f and OR 133g to provide a series of three stop pulses.

A Shift latch 126 (FIG. 2t) is connected to be set by the off outputs of the Medium Speed latch 122 and the High Speed latch 124 through OR 126a and single shots 127a and 127b respectively, to momentarily inhibit gating of the outputs of the Low and Medium Speed latches 120 and 122 through ANDs 112 and 114 when decelerating. This prevents the next immediate Low Speed or Medium Speed emitter pulse from attempting to drive the motor 22 and thus insures the correct decelerating sequence. The Shift latch 126 is reset through ANDs 123j or i, OR 123q, inverter 125, single shot 128 and OR 126b by either the Low Speed or Medium Speed emitter single shot 109a or 109b, so that the following emitter pulse can be gated by AND 112 or 114.

Figure 8:
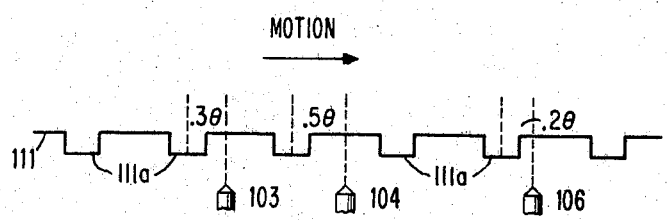
FIG. 8 is a schematic showing of the relative positions of the emitter pickup heads and the emitter teeth in one form of the invention.

As shown in FIG. 8, the Low Speed emitter head 104 is positioned approximately in the middle of the slot between two adjacent teeth of the emitter disc 111 when the motor 22 is detented under power, the Low Speed emitter head 104 being indicated as being .5θ as the mechanical angle from the middle of the next tooth. The Medium Speed head 106 is located closer to the next tooth, being only .2θ from the middle of the next tooth. While single spacing may be performed using the Low Speed head 104, a Single Space 6 line per inch emitter head 103 is provided in the present instance which is located between .3θ and .4θ from the center of the next tooth, so as to provide a higher speed when single spacing, and thus increase the machine throughput. The head 103 is connected through amplifier 108a and AND 110d to the OR 100 and AND 98 in similar manner to the heads 104 and 106. AND 188a and inverter 105a provide inputs to ANDs 110d and 110e for single space operation.

Figure 9:
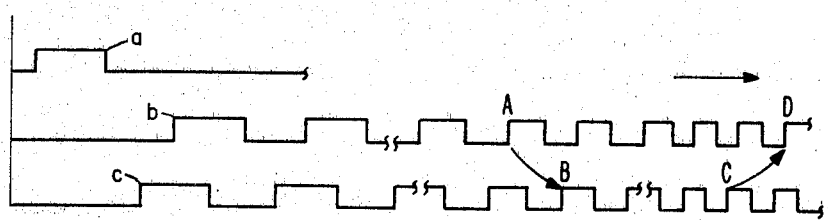
FIG. 9 is a timing chart showing typical transfer points in accelerating and decelerating.

As shown in FIG. 9 the motor starts with the Start pulse (a) and is normally accelerated by feedback pulses from first the Low Speed head 104 up to some point A shown on the curve (b). Control is then transferred to the Medium Speed head 106 at some point B shown on the Medium Speed feedback pulse curve (c). When it is desired to stop, control is transferred from the Medium Speed curve (c) at some point C to the Low Speed curve (b) at some point D, after which stopping is effected by the usual stop pulses.

AND 123a (FIG. 2s) provides for turning on the Medium Speed and High Speed latches 122 and 124 (FIG. 2t) through ORs 123m and n, and ANDs 121a and 121c when the line counter 150 (FIGS. 2d–e) reaches a count of 15 before a compare occurs between the skip command and the stored channel skip designation in the Carriage Control Buffer 40.

The Medium Speed latch 122 (FIG. 2t) is set through AND 121a from OR 123m, or 123k, and AND 123f when a skip of from 4–11 lines is called for at 6 lines per inch, and AND 123e provides a signal to the High Speed latch 124 through OR 123l, OR 123n and AND 121c.

AND 123c provides a signal to the Medium Speed latch 122 through AND 121a when a skip of 6–13 lines at 8 lines per inch is called for, and AND 123d provides a signal to High Speed latch 124 through AND 121c, when a greater than 14 line skip is called for.

Deceleration from High Speed to Medium Speed at 8 lines per inch is provided by resetting the High Speed latch 124 through AND 123g, OR 123p, AND 121d, and OR 124a, thirteen lines from the end of the skip. At 6 lines per inch the latch 124 is reset through ANDs 123h, OR 123p and AND 121d, eleven lines before the end of the skip.

The Medium Speed latch 122 is reset at 8 lines per inch, five lines before the end of the skip, through AND 123g, OR 123p, AND 121b, and at 6 lines per inch it is reset three lines before the end of the skip through AND 123h, OR 123p, AND 121b, and OR 122a.

Figure 10:
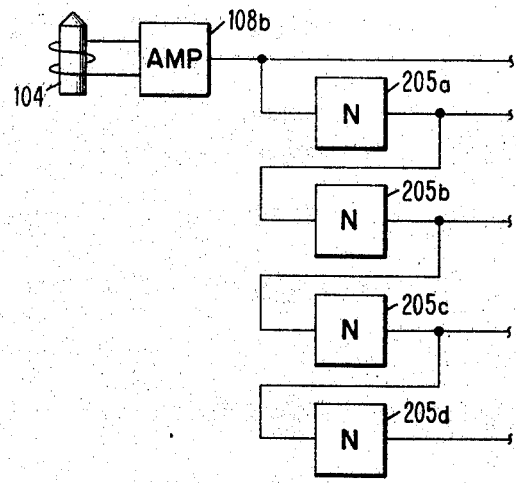
FIG. 10 is a schematic diagram of an emitter pulse circuit utilizing multiple inversions.
Figure 13:
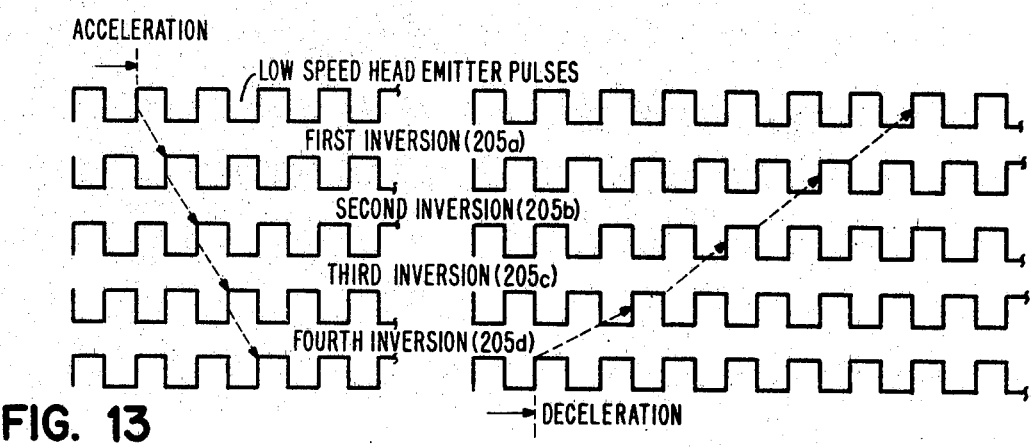
FIG. 13 is a timing chart showing the pulse relation when accelerating and decelerating with a multiple inversion circuit.

As shown in FIG. 10, a single low speed head 104 can be used with the emitter 111, and several different motor speeds are obtainable by using repeated inversions of the signal by means such as inverters 205a, 205b, 205c and 205d to invert and change the effective time and displacement relations of the pulses by advancing the occurrence of the next effective positive pulse as shown in FIG. 13 when the drive is transferred from one inverter to the next in sequence to obtain the Medium Speed, High Speed and still greater speed signals, instead of using multiple emitter heads as shown in FIG. 2r.

Figure 11:
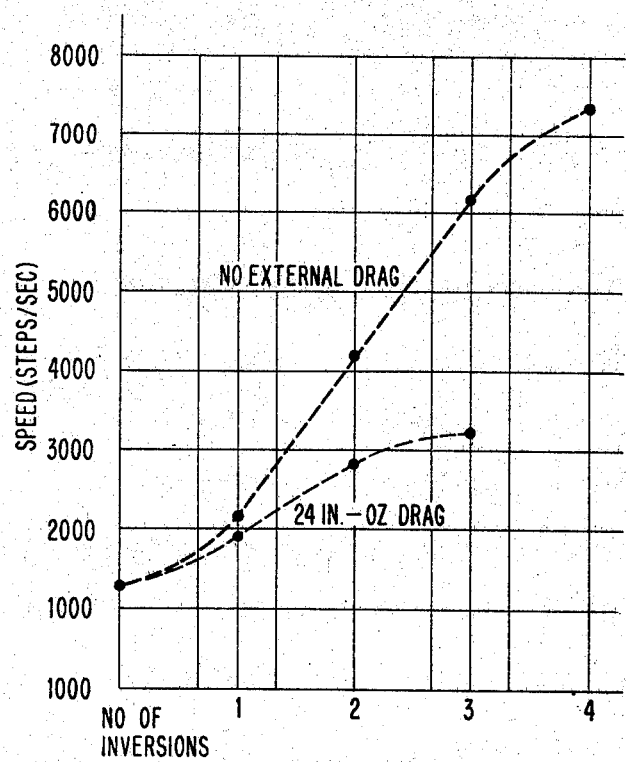
FIG. 11 is a chart showing the relations of speed with multiple inversion pulses.
Figure 12:
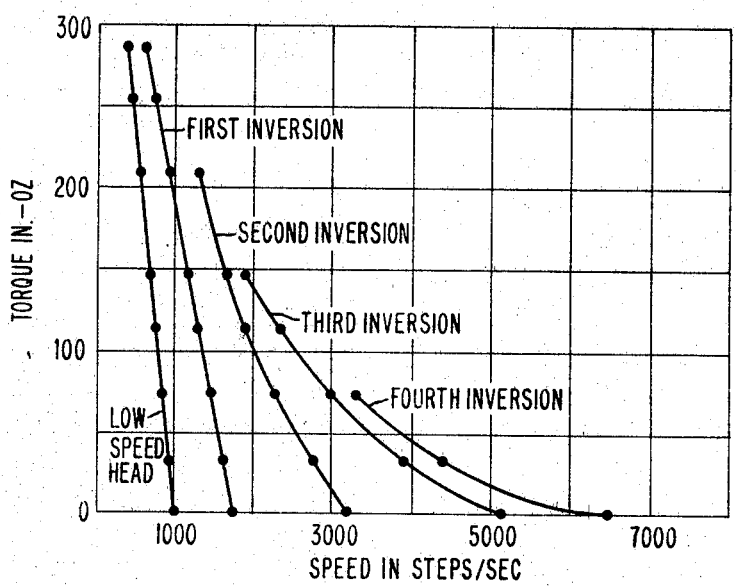
FIG. 12 is a chart showing the relation of speed and torque with multiple inversions.

The various speed and torque characteristics for the multiple inversion arrangement of FIG. 10 are shown in FIGS. 11 and 12, and in FIG. 13 are shown a plurality of emitter pulse curves with the dotted lines showing a typical transfer path from one speed to the next, the sequence being from one curve to the next, in order when accelerating, and in the reverse order when decelerating.

The high speed eject rate of the printer shown generally in FIG. 1 will usually be greater than the stacking capability of the stacker used with the printer. This means that the speed of the feed rolls 6, 8 as determined by the constant speed motor 7 will be such that they attempt to feed the form 13 to the stacker (not shown) somewhat faster than the slow speed skip, so that under slow speed conditions, the feed rolls 6 slip on the form. When the tractors 19 operate at the High Speed rate, the form 13 is fed to the stacker rolls 6 at a rate in excess of the rate at which they feed the form 13. If this condition should exist for more than a predetermined time, a queuing of the form 13 would result, which if allowed to continue, would ultimately cause stacking errors.

To prevent this condition from occurring, a forms velocity limiter control circuit 210 (FIG. 2t) is provided, which is controlled by the ON outputs on the Low, Medium and High Speed latches 120, 122 and 124, and operates a Speed Limit latch 212 which resets the High Speed latch 124 to reduce the speed of the tractor motor 22 whenever the excess of the form 13 between the tractors 19 and stacker feed rolls 6, 8 reaches a value such tthat a form jam is imminent (approximately 12 inches, for example).

The average paper velocity of the form 13 during a typical customer program may be less than 30 inches per second, but occasionally a form 13 with a single printed line occurs such that the form 13 is fed at 65 inches per second in the N1, a well known printer which has been on the market for several years. The stacker feed rolls 6, 8 can be driven at a constant speed equivalent to a form speed of about 38 inches per second. When the tractor 19 operates at a slow speed on the order of 25 inches per second, the feed rolls 6 will slip slightly. Medium speed operation of the tractor 19 may be equivalent to about 35 inches per second, and the high speed operation about 65 inches per second, so it will be seen that in the High Speed mode, an excess of the form 13 will occur over an interval of time.

Figure 14:
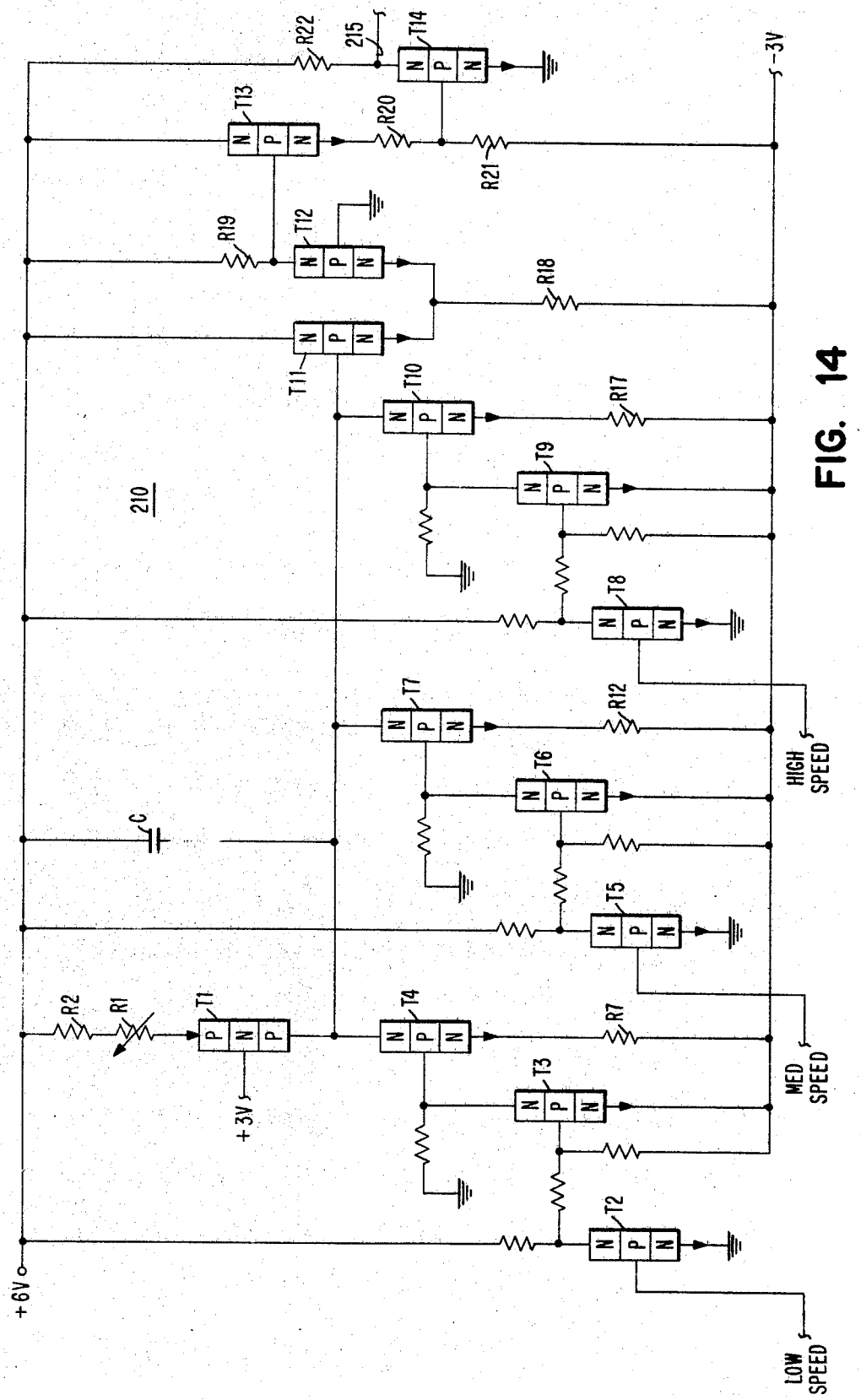
FIG. 14 is a circuit diagram of a forms velocity control circuit embodying the invention and which may be used in the system of FIGS. 2a–2t.

Referring to FIG. 14, a transistor T1 is shown providing through resistors R1 and R2 a calibrated discharge circuit for a capacitor C. The resistors R1 and R2 may be selected to provide a discharge rate on the order of 1 milliamp proportional to a form speed at the stacker rolls of 38 inches per second. Charging circuits are provided for the capacitor C through semiconductor switch means such as transistors T4, T7 and T10, and their associated resistors R7, R12 and R17 which are selected to provide charging rates on the order of .660 milliamp, .260 milliamp and .790 milliamp corresponding to low, medium and high tractor speeds of 25 inches per second, 35 inches per second and 65 inches per second respectively. Transistors T2–T3, T5–T6 and T8–T9 control the switching of transistors T4, T7 and T10, respectively. For example, the ON output of the Low Speed latch 120 turns transistor T2 on. This drops the base voltage of transistor T3 and turns it off, raising the base voltage of transistor T4, thus turning it on to charge capacitor C.

Transistor T14 which is connected between the plus terminal of the source and ground through resistor R22 is reverse biased to provide an output signal to turn the Speed Limit latch 212 on and reset the High Speed latch 124. Transistor T14 is switched by transistor T13, through divider resistors R20, R21, which is in turn controlled by a differential amplifier comprising transistors T11 and T12 and associated resistors R18, R19, which respond to reverse biasing of transistor T11 by the voltage level of capacitor C.

Description of operation

Operation of the clock 60 (FIG. 2i) during readout operations is effected under the control of a Carriage Control buffer Address counter Gate trigger 136 (FIG. 2f) which is set by the decode 4 signal from the decode circuit AND 132a (FIG. 2r). Operation of the carriage drive circuit 96 (FIG. 2s) is effected by means of a Carriage Start latch 140 (FIG. 2f) which is turned on either by an Immediate Carriage Go signal from single shot 138 and AND 139 (FIG. 2q) or by a Carriage Go After Print signal from AND 148 (FIG. 2f) if a print operation is involved. These signals set the latch 140 through OR 144 and AND 142 or AND 146, respectively. Set of the Start Latch 140 provides a Carriage Go pulse through AND 141 for setting the Low Speed latch 120 (FIG. 2t) to start carriage operation. Inverter 141a provides a Not Carriage Go signal. Stopping of the carriage is effected by resetting the Low Speed latch 120 through operation of a Line Counter 150 (FIGS. 2d–e) which comprises a plurality of triggers 150–1, 150–2, 150–4, and 150–8 arranged in a binary stepping fashion. ANDs 151 and 152 provide Line Count 15 and Line Count 1 signals, respectively. Inverter 153 is used to inhibit further advance of the counter 150 when a count of 15 is reached without a compare through AND 154a.

The Low Speed latch 120 is reset through OR 120a by a Carriage Register Reset signal generated at single shot 161 through OR 160 (FIG. 2f), in response to the output of a Stop AND 162 which responds to the decode 5 and line count 15 signals with a carirage Not skip signal from OR 163.

Status latches 164a–d (FIG. 2p) provide Busy, Channel End, and Device End Gate and Device End signals, indicative of the operating condition of the apparatus, through decode ANDs 165a–g and associated ORs 166a–g, and ANDs 92 and 185. Sense latches 176a–e (FIG. 2q) provide indication of equipment error conditions.

Tag line signals represented by the Service-In and Status-In signals are produced by tag line latches 168a, 168b (FIG. 2o) for control purposes, through decode ANDs 169a–g and ORs 170a–e. Bus assembly circuits are provided in FIGS. 2m–n, including decode ANDs 157a–f, ANDs 158a–q, ORs 167a–e and line drivers 155a–i for assembling the Bus In bits. Parity for Bus In is provided by Exclusive ORs 178a–g, inverter 179 and AND 181. Bus Out parity check is provided by Exclusive ORs 189a–h through line receivers 156a–i.

In operation, the Carriage Control Buffer 40 (FIG. 2h) is loaded in response to a CCB Load command through decode AND 74c (FIG. 2b) from over the Bus Out lines 69 which sets the CCB Load latch 72c, provided that the CCB Gate Load latch 72a has been previously set by a command through decode AND 74a (FIG. 2b). The CCB Load latch 72c initializes the operation by resetting the CCB Address Register 56 (FIGS. 2d–e) to address 1 through ORs 171, 172, single shot 173, and OR 174 and sets the Buffer Control latch 80 through OR 81 (FIG. 2f). A delayed reset pulse is provided by inverter 174a and single shot 174b to OR 174. The Buffer Control signal gates the triggers 56–1 and 56–2 of the CCB Address Register 56 at each RO time to permit sequencing of the CCB addresses in each clock cycle.

Figures 3, 7:
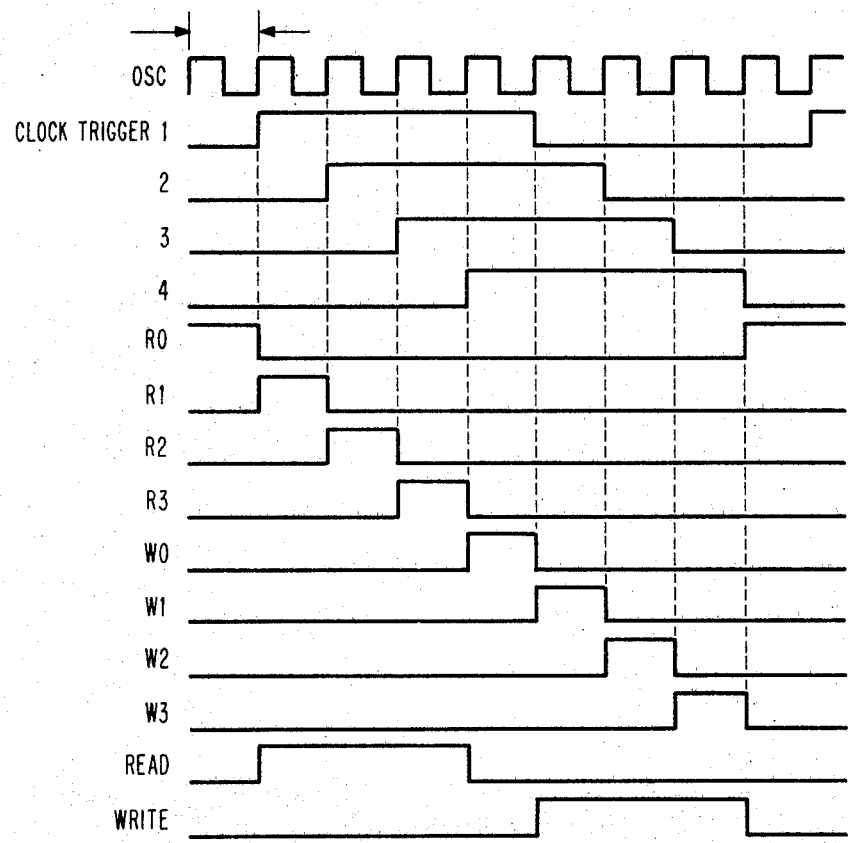
FIG. 3 is a block diagram showing the arrangement of FIGS. 2a through 2t.
FIG. 7 is a clock timing chart.

Since the command to load the buffer 40 has been stored in latch 72c (FIG. 2b), and the buffer address has been modified to the correct starting point, buffer byte 1, the control system is prepared to receive data from the channel (Bus out 69). The data is loaded under the control of the I/O tag lines Service-In and Service-Out through AND 82 (FIG. 2n), which produces the Adapter Clock Start signal at OR 84. This sets the Clock Run trigger 62 (FIG. 2i) through OR 70 and AND 68, starting the clock 60 and permitting it to take one cycle. The Clock Run trigger 62 resets at the fall of trigger 60-4 of the clock 60 which corresponds to RO time as shown in FIG. 7. Since the clock cycle is two microseconds, which is less than the minimum data period for a byte of data received from the Bus Out lines 69, the clock 60 will return to RO before the next data byte is available.

Figure 2K:
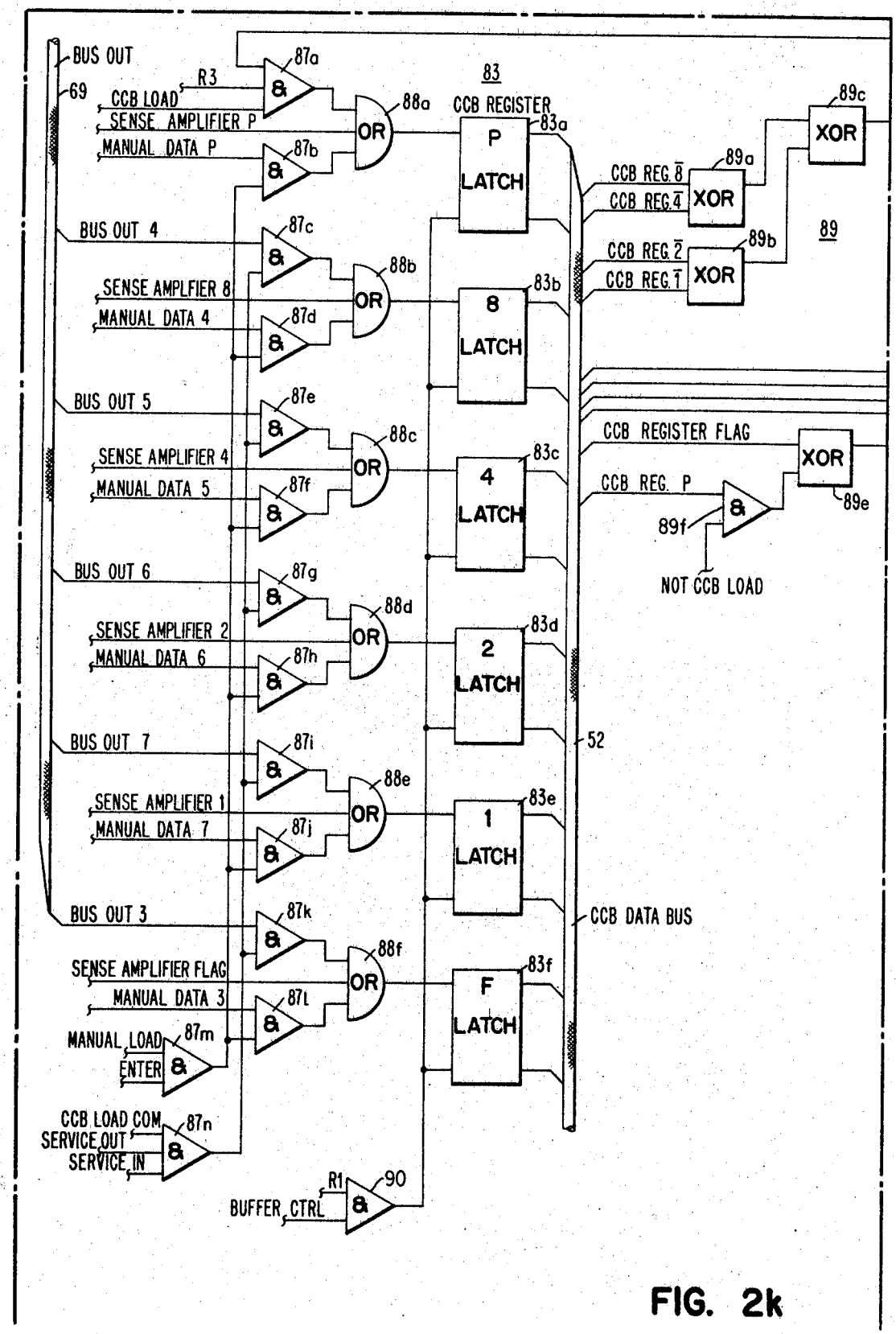
Figure 2L:
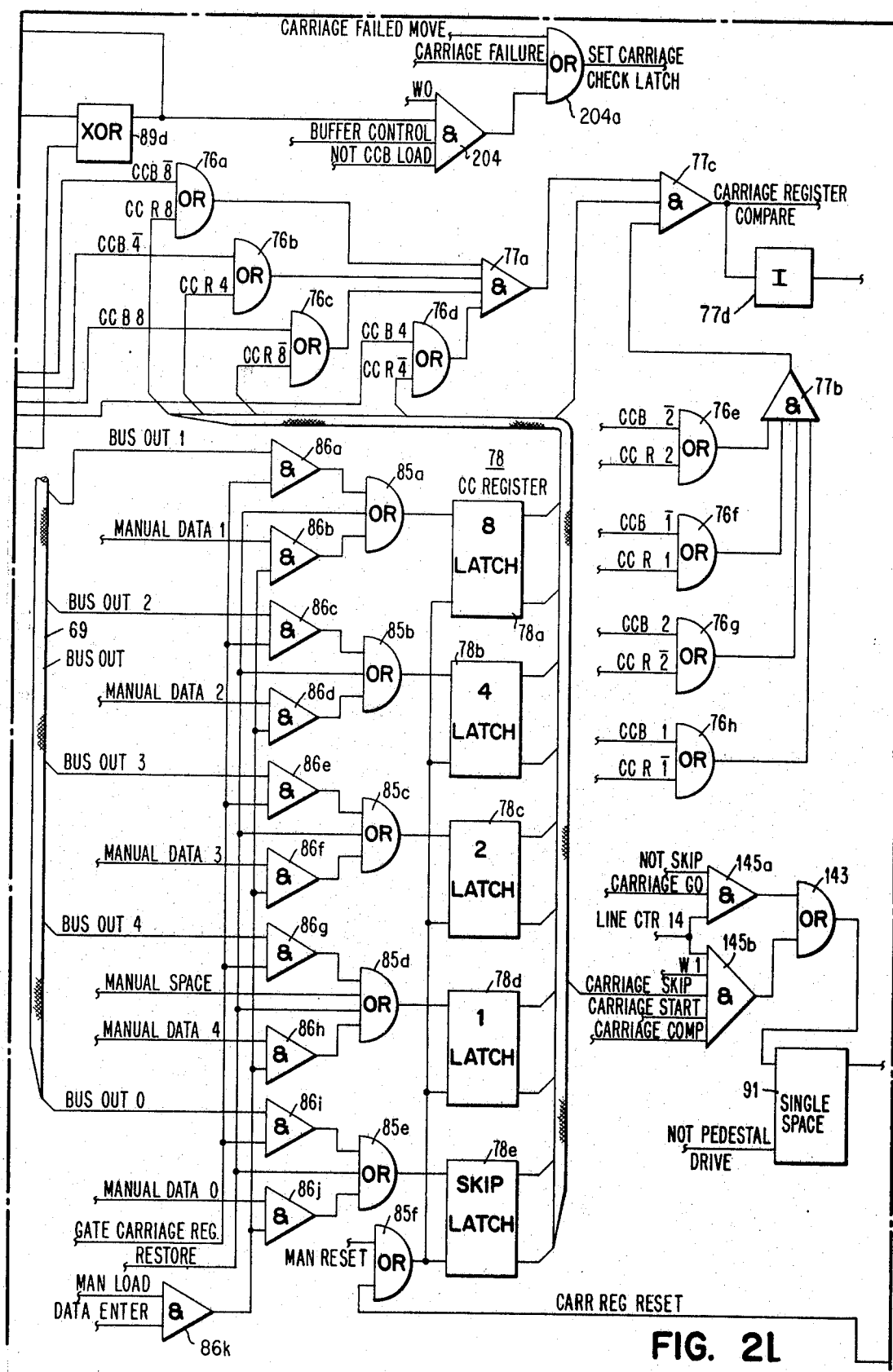
Figure 2M:
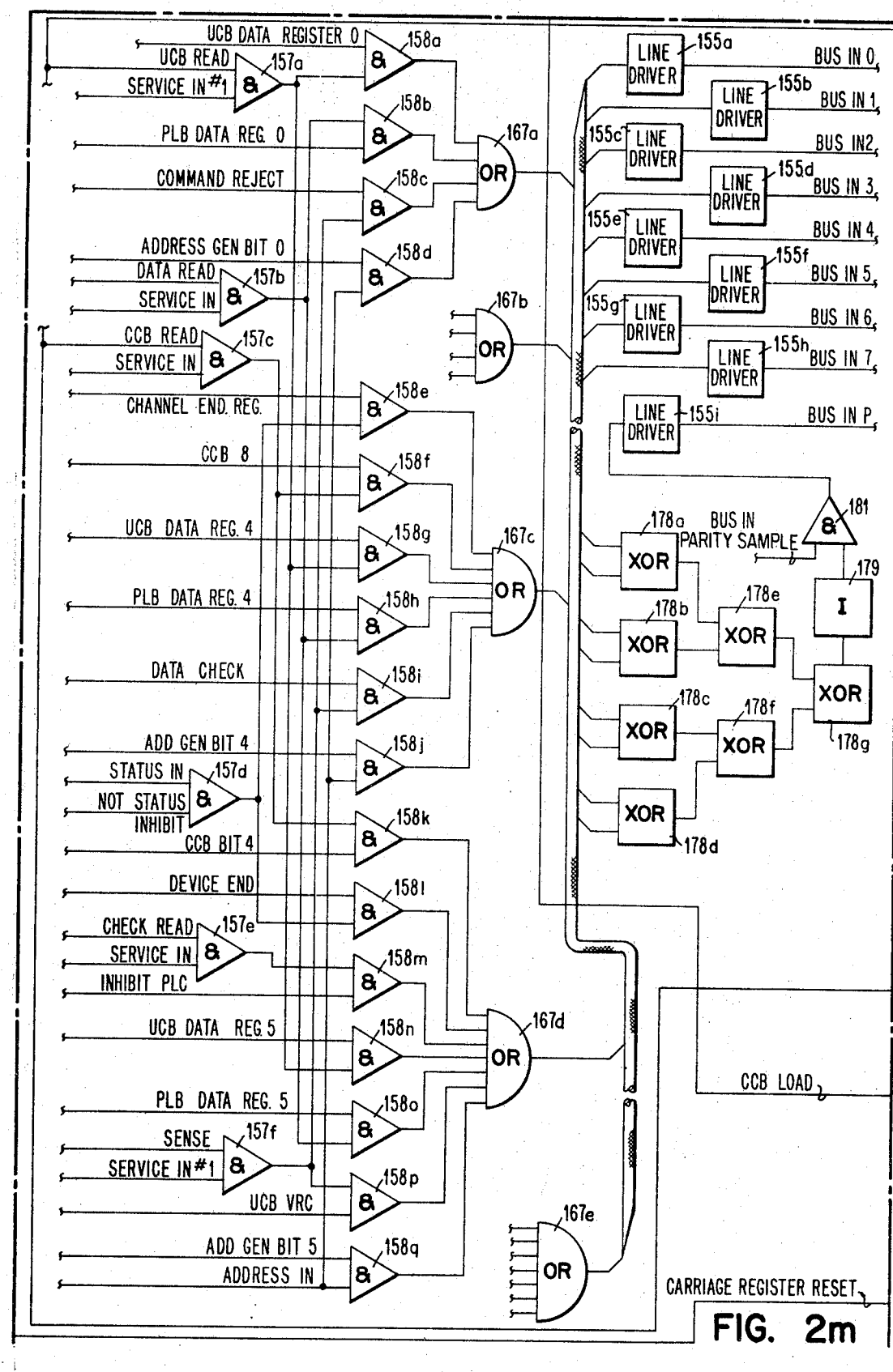
Figure 2N:
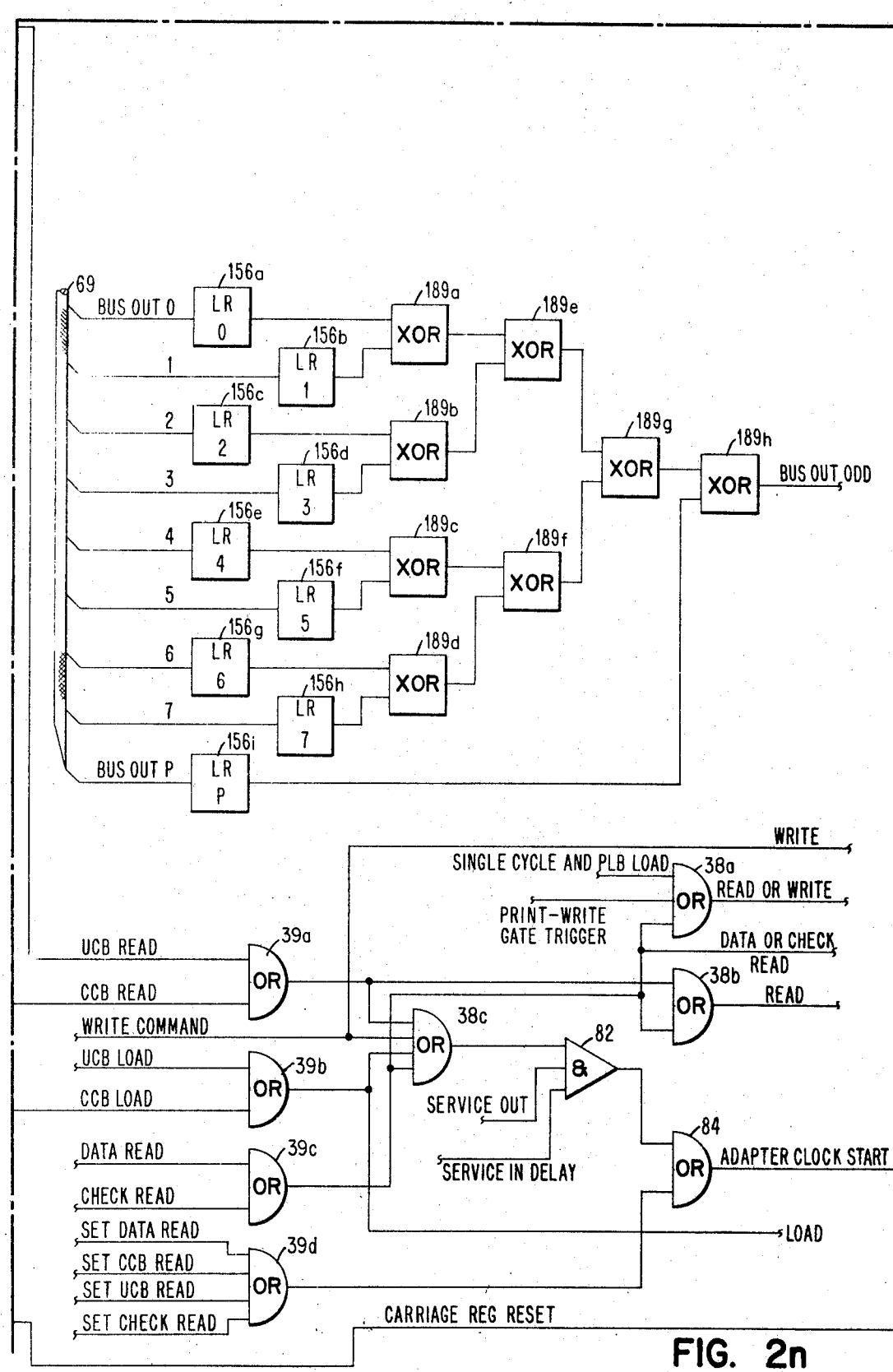
Figure 2O:
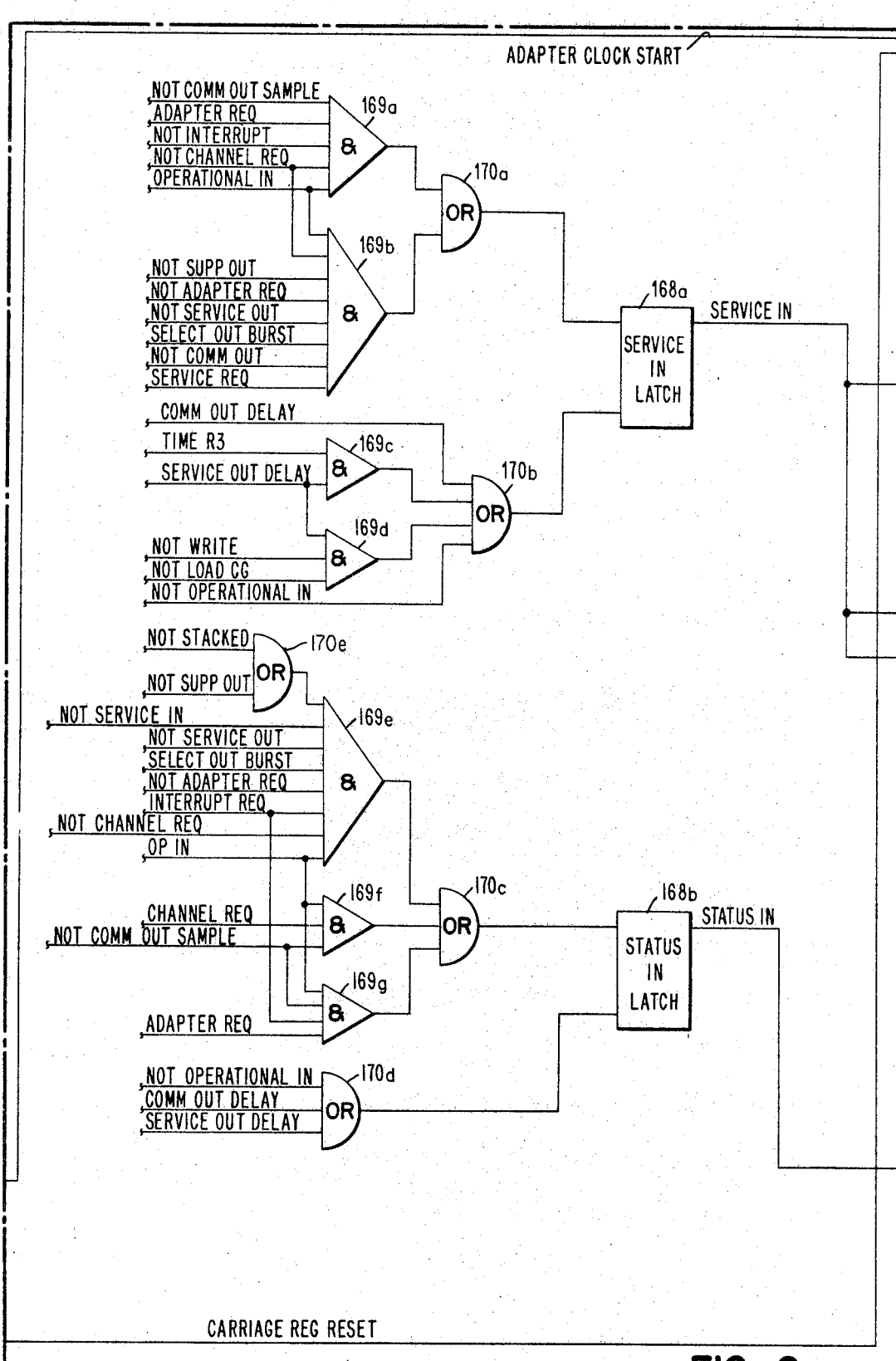
Figure 2P:
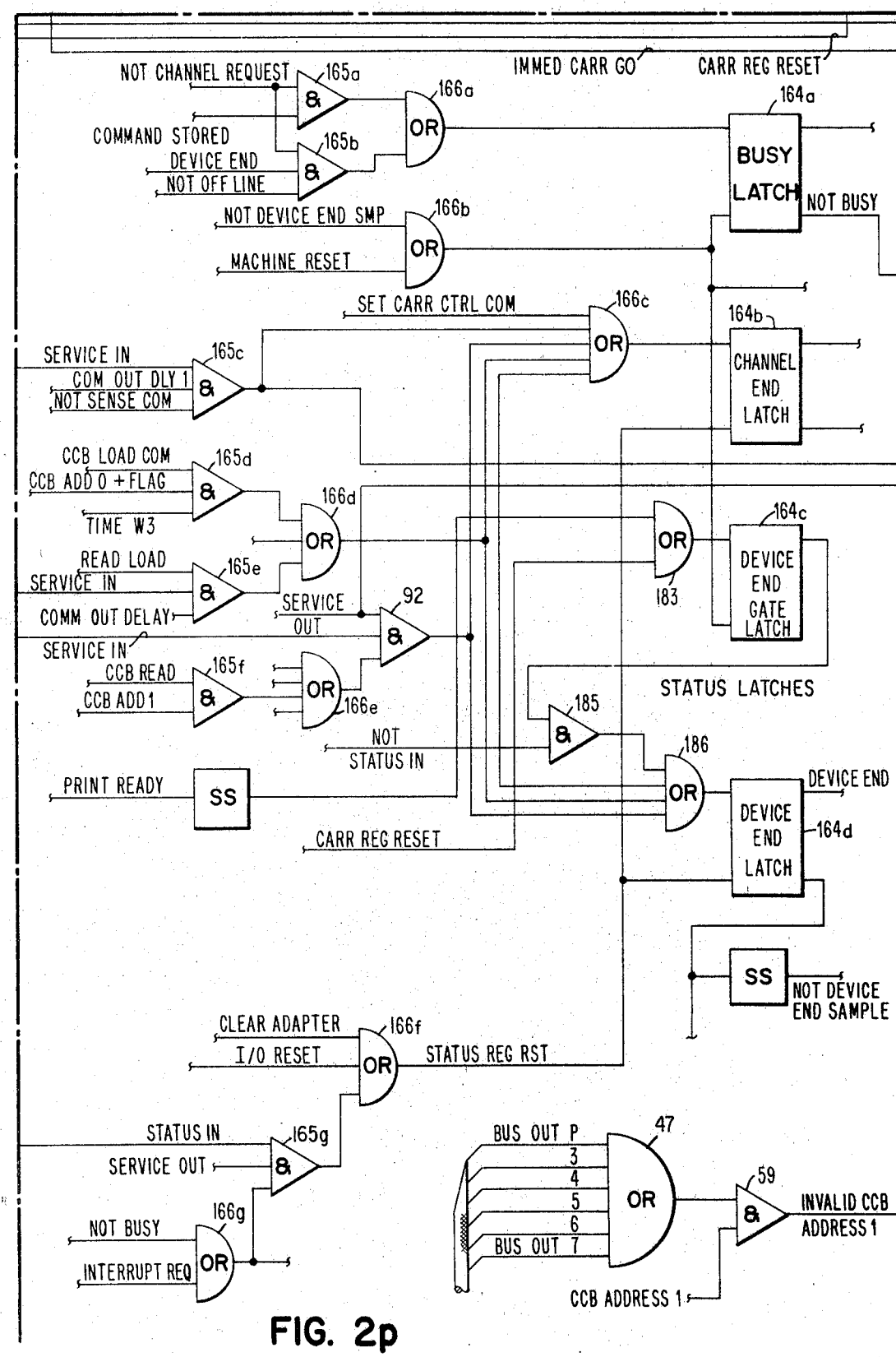

A CCB parity bit is generated from the CCB register 83 contents and is inserted in the bit latch 83a of the register 83 on an odd parity basis through the exclusive ORs 89a–d of parity circuit 89 (FIGS. 2k–l). The x–y drivers and switches 42, 46, 44 and 48 (FIG. 2g) are turned on by a Read signal for R1, R2 and R3 time as shown by the timing chart in FIG. 7. However, the contents of bit 1 in the Carriage Control Buffer 40 are not recycled because a Strobe signal (which is a delayed Read signal used to gate the sense amplifiers 54 (FIG. 2h) and is produced by a time generator 38 (FIG. 2g) in response to a Read signal (RD)) does not occur, and the output of the sense amplifiers 54 is not gated in ANDs 55, so that the old contents of the Carriage Control Buffer 40 are erased during loading.

Figure 2Q:
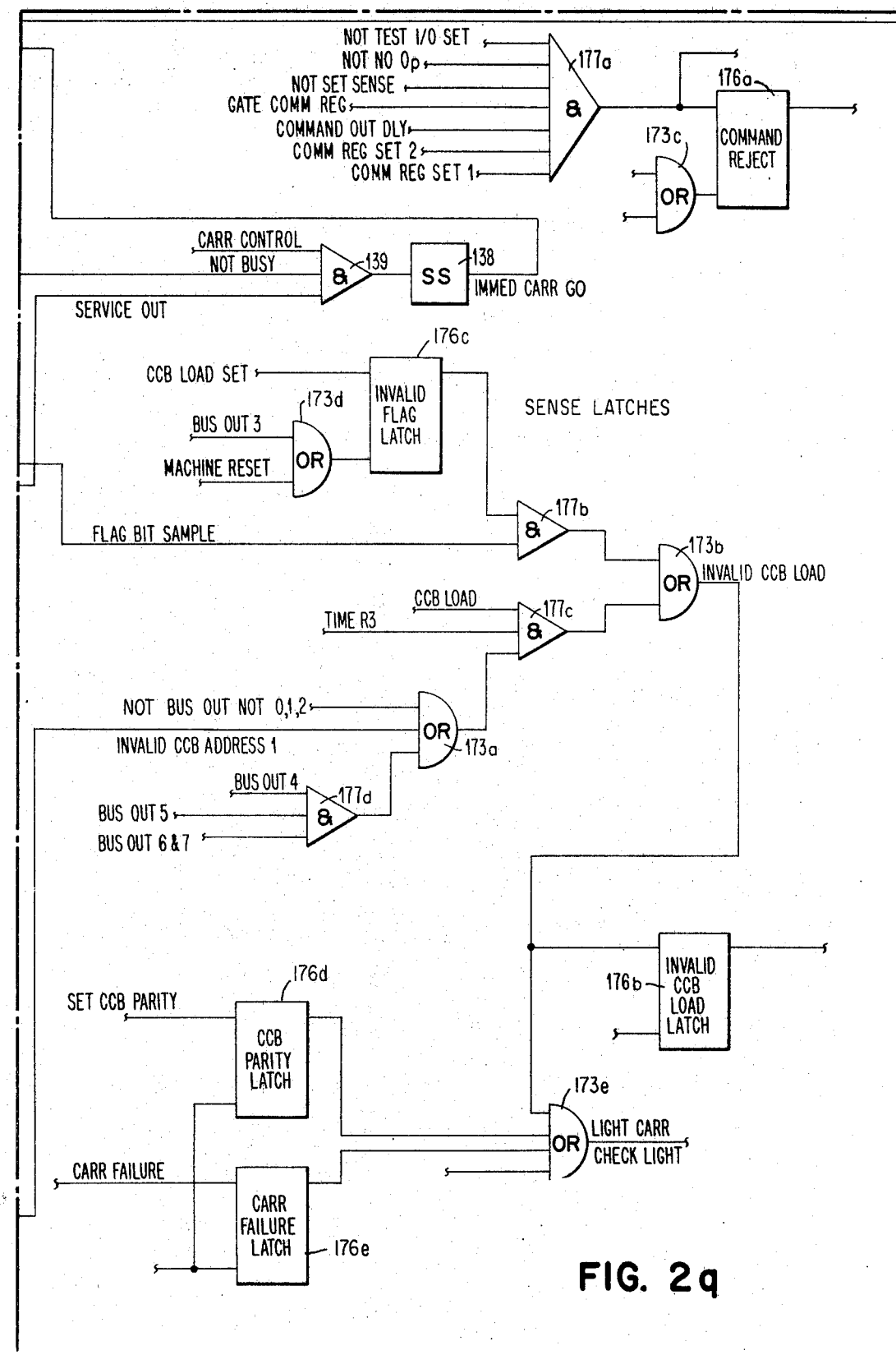
Figure 2R:
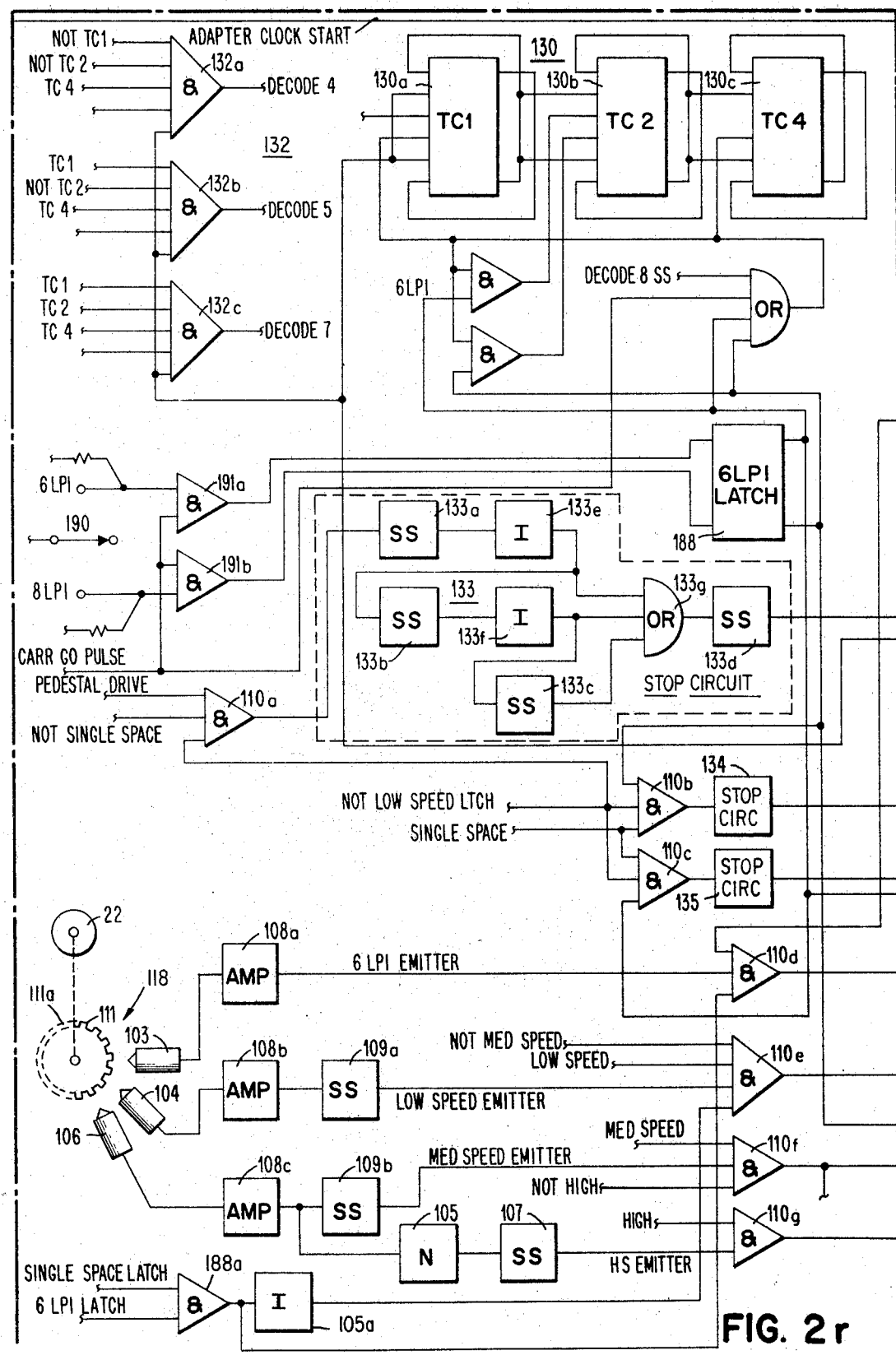
Figure 2S:
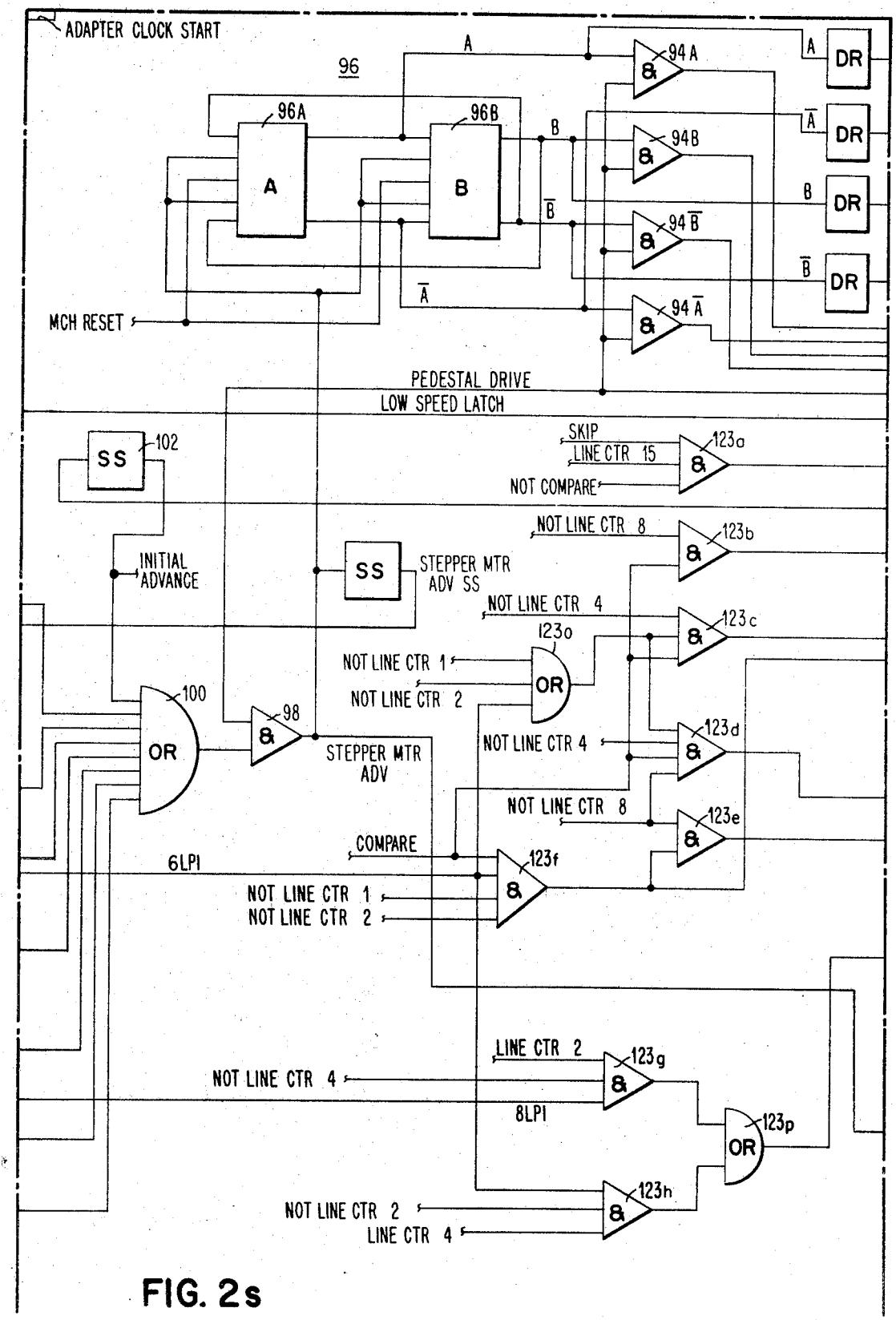
Figure 2T:
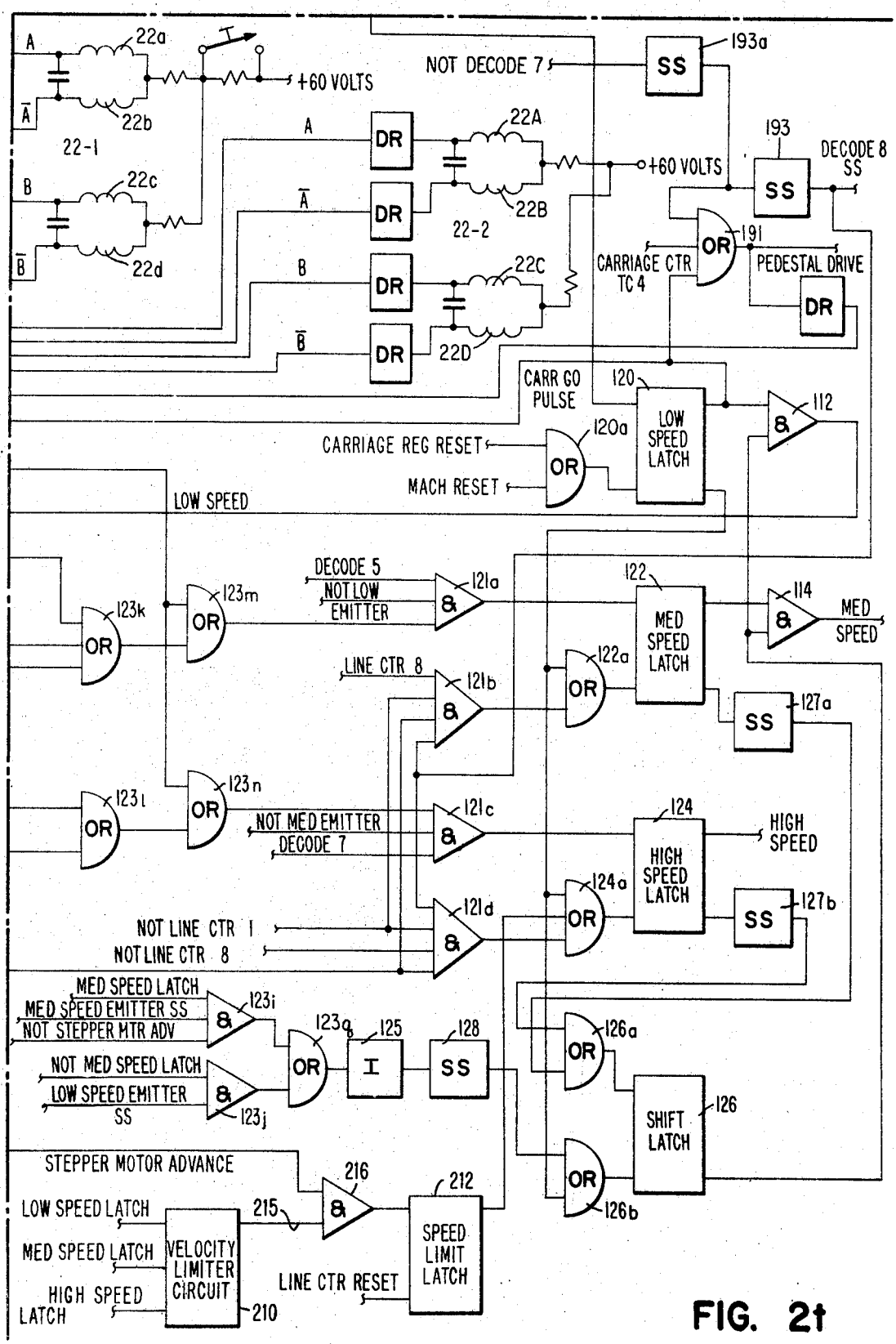

As described previously, data is loaded starting from position 1, and reset of the CCB Address Register 56 occurs with the coincidence of RO and the CCB flag bit indicating the end of the line to be printed from AND 175 through OR 174 (FIGS. 2d–e). The clock 60 continues through the end of the current cycle and at RO the CCB Address Register 56 will be advanced to position 2. The contents of position 1 remain in the CCB register 83. Should a program error occur during loading, as evidenced by the 0, 1, or 2 bits on the Bus Out 69, a program error is indicated by Invalid CCB Load generated by latch 176b through OR 173a, AND 177c or AND 177b and OR 173b (FIG. 2q). Other sense latches 176a, 176c, 176d and 176e function with AND 177a and OR 173c to provide a Command Reject signal; OR 173d to provide an Invalid Flag signal; and OR 173e to provide a CCB Parity check and a Carriage Failure check. AND 177d provides an input to OR 173b through OR 173a and AND 177c.

Carriage operations may occur with or without printing. The carriage commands shown in FIGS. 6a and 6b reflect this by describing the byte structure for an operation with a print command or for a carriage command alone. If the function is to Space/Skip immediate the Carriage Control latch 75a (FIG. 2c) is set through AND 63b, OR 65b and decode AND 66a (ANDs 66c and 66d provide inputs to latches 75c and 75d, respectively). Reset is effected by Device End or I/O Reset signals through OR 75e. If a Write and Space/Skip command is sensed, the White latch 75b will be set through decode AND 66b, and reset through OR 75f. ANDs 66c and 66a provide inputs to latches 75c and 75d, respectively. In either case, a carriage function is indicated so that Gate Carriage Register signal rises at OR 77 (FIG. 2c) to permit loading of the bus-out bits from Bus Out 69 to the Carriage Command register 78 (FIG. 2l) through ANDs 86a, c–e–g and i. Decode ANDs 66c and 66d provide control of CCB Read Latch 75c and Sense Latch 75d, respectively.

To perform a carriage function, the Carriage Start latch 140 (FIG. 2f) is set either by the Carriage Go After Print signal from AND 146, or the Immediate Carriage Go sgnal from AND 142 through single shot 138 and AND 139 (FIG. 2q) when a carriage command bit configuration exists from Bus-Out and the Command Out tag line rises. If the carriage is not already in motion, Carriage Start Latch 140 starts it by bringing up Carriage Go at AND 141 (FIG. 2f). The carriage will be started in the low speed mode by the Carriage Go signal setting the Low Speed latch 120 (FIG. 2t).

Assuming a carriage command is entered into the Command Register 78 (FIG. 2l) by a Gate Command Register signal from AND 65B (one of a group of ANDs 65A–C (FIG. 2b) providing inputs to different ones of the Command Latches 75a–d (FIG. 2c)) to space one line, then the Skip latch 78e of the Carriage Command register 78 (FIG. 2l) will be off, so that the 4 and 8 triggers 150-4 and 150-8 of the line counter 150 will be set (FIGS. 2d–e) by the Not Skip signal from AND 149 (FIG. 2d). The Not 2 bit of the Single Space command sets the 2 trigger 150-2 of the counter 150 through AND 147 (FIGS. 2d–e). Accordingly, line triggers 150-2, 150-4 and 150-8 will be set and a single space condition has been decoded from the Carriage Command register 78. The Line Counter 150 registers a count of 14, so the Single Space latch 91 (FIG. 2l) is set through decode AND 145a and OR 143. Decode AND 145b provides for operating latch 91 when a command to skip one space is received as distinguished from a single space command. Carriage motion starts as follows: The Carriage Go signal from AND 141 (FIG. 2f) sets the Low Speed latch 120 (FIG. 2t), giving the carriage an Initial Advance pulse from single shot 102 (FIG. 2s) and starting motion by advancing the motor drive triggers 96A and 96B which switch current in the motor drive windings 22a–d and 22A–D in a well-known manner. Additional advance pulses occur from the motor emitter heads 103 or 104 through AND 98 and OR 100 from AND 110d or 110e so that the Carriage Counter 130 is advanced by the Stepper Motor Advance signal and its contents are decoded by the decode circuits 132. For a pitch of 6 lines per inch, 8 pulses total are required for a single space advance and AND 110d is activated, and for 8 lines per inch, 6 pulses are required and AND 110e is effective. At Decode 4 time the CCB Address Counter Gate trigger 136 (FIG. 2f) is set, causing set of the Buffer Control latch 80 through AND 79 and OR 81, and starting the clock 60 by raising Carriage Clock Start at AND 180 and applying a signal to Clock Run trigger 62 through OR 70 and AND 68 (FIG. 2i). Reset of CCB Address Counter Gate trigger 136 is effected at W1 time, being gated in AND 136a by Buffer Control and the CCB Address Counter Gate trigger 136 ON output. AND 136b provides proper timing relative to settling of the carriage tractors 19. The fall of CCB Address Counter Gate trigger 136 causes the OFF output to gate reset of Buffer Control latch 80 at RO. The clock 60 takes one cycle stopping in RO in AND 196. In doing so, the contents of the Carriage Control Buffer 40 byte 2 are read out to the CCB register 83, and the CCB Address Register 56 advances to position 3 at RO time. The Line Counter 150 was advanced to count 15 at the fall of R1 time, and line count 15 and W2 reset the Carriage Start latch 140 through OR 131, AND 137, and OR 115.

When the Carriage Counter 130 (FIG. 2r) advances to Decode 5, a Stop pulse is generated at OR 160 through AND 162 (FIG. 2f). ANDs 160a and 160b provide other inputs to OR 160. This turns on the Carriage Register Reset signal at single shot 161 which resets the Line Counter 150, through OR 182 (FIG. 2d) and the Carriage Command register 78 through OR 85f (FIG. 2l). It also turns on the Device End Gate latch 164c through OR 183 (FIG. 2p) causing the Device End latch 164d to turn on through AND 185 and OR 186, producing the Device End signal in the channel status byte. This indicates to the channel that the carriage operation is ended.

The Line Counter Reset signal from the line counter 150 (FIGS. 2d–e) also initiates the actual carriage stopping sequence by resetting the Low Speed latch 120 (FIG. 2t), which starts a single string of 3 stop pulses through AND 110b, Stop circuit 134 (FIG. 2r) (assuming 8 lines per inch pitch) OR 100, and AND 98 (FIG. 2s), and gates out or inhibits at AND 110e the feedback pulses from the motor emitter head 104 (FIG. 2r).

The Carriage Counter 130 advances six pulses per line when printing at 8 lines per inch and eight pulses per line when printing at 6 lines per inch. The particular pitch is determined by a line pitch latch 188 through switch 190 and ANDs 191a–b. The triggers 130a, 130b, and 130c are gated to bring up the Decode 4 signal four pulses from the end of the line space, Decode 5 signal 3 pulses from the end of a line space, and the Decode 7 signal one pulse from the end of a line space. The counter 130 is reset on the eighth or last pulse by Decode 8 produced by a single shot 193 from a single shot 193a in response to a Not Decode 7 signal.

For a double or triple space, the same Carriage Start, Line Counter control and CCB Address Register timing applies for the first line space. But for additional line spaces, the clock 60 is started by each Decode 4 signal which sets the CCB Address Counter Gate trigger 136 (FIG. 2f) starting the clock 60 for one cycle. Each clock cycle advances the Line Counter 150. When the Line Counter contents is 15, Line Count 15 rises at AND 151 (FIG. 2e) which resets CCB Address Counter Gate trigger 136, and brings up the Stop pulse at AND 162 at Decode 5 time, starting the stop sequence which stops the carriage mechanism. Carriage Register Reset from the single shot 161 (FIG. 2f) starts the carriage operation ending sequence, as previously described. Note that the Line Counter 150 is initialized to a count of 13 through ANDs 116 and 149 for a double space, and to a count of 12 through AND 149 alone for a triple space at the start of the space command.

Description of a low speed skip operation is as follows: A Skip Immediate or Skip After Write command will be entered in the Carriage Command register 78 (FIG. 2l) and the bus out bit 0 will turn on the Skip latch 78e in the register 78. The Carriage Start latch 140 (FIG. 2f) will be turned on by Immediate Carriage Go or Carriage Go After Print from AND 142 or AND 146 through OR 144. The CCB Address Counter Gate trigger 136 is set by the Carriage Start signal through AND 192 and OR 194 and brings up Carriage Clock Start. The Buffer Control latch 80 will be set by the on output of the CCB Address Counter Gate trigger 136, gating the advance of the CCB Address Register 56 at RO time (FIGS. 2d–e). The clock 60 will advance the CCB Address Register 56 and the Line Counter 150. The carriage mechanism has been activated by the Carriage Go signal generated by the Carriage Start latch 140 and AND 141 (FIG. 2f).

The Carriage Start latch 140 is not reset, so the return of the clock 60 to RO again sets the CCB Address Counter Gate trigger 136 through AND 192 and OR 194 (FIG. 2f) permitting the clock 60 to run an additional cycle. The Line Counter 150 and the CCB Address Register 56 advance, and the contents of the addressed bit location in the Carriage Control Buffer 40 is read out to the Carriage Register 83 each clock cycle.

Assume that the skip channel digit stored in the bits 1, 2, 4, and 8 of the Carriage Command Register 78 is stored in byte 5 of the Carriage Control Buffer 40, and assume also that the form 13 was located at line 1 when the carriage skip was started. As shown in the timing diagram of FIG. 7, a Carriage Register Compare signal will occur at AND 77c (FIG. 2l) when the contents of Carriage Control Buffer 40 position 5 is read into the CCB register 83 (inverter 77d provides a Not Carriage Register Compare signal). This will set the Carriage Compare latch 159 through OR 113A, AND 113 and OR 117 (FIG. 2f). AND 113b provides another input to OR 117. Further advance of the CCB Address Register 56 is inhibited after RO of the current clock cycle because CCB Address Counter Gate latch 136 is reset through AND 67 and OR 95. The CCB Address Register 56 will have advanced four times. Carriage Compare from the latch 159 resets CCB Address Counter Gate trigger 136 and the Carriage Start latch 140. The Line Counter 150 is complemented by the Carriage Compart signal over conductor 195 (gated by an input on line 197 through OR 154c from AND 154b, one of the two inputs from ANDs 154a–154b) so that its contents are changed from a count of 4 to a count of 11. The clock 60 completes the present cycle and stops in RO. The Carriage Go signal from the Carriage Start latch 140 started the carriage by setting the Low Speed latch 120 (FIG. 2t), turning on Pedestal Drive at OR 191 to gate ANDs 94A, B, $\bar{A}$ and $\bar{B}$, gating the emitter pulses from OR 100 at AND 98. Carriage Compare Latch 159 is reset by AND 117a.

Only 8 microseconds will have elapsed, so the first Decode 4 signal from the Carriage Counter 130 will not have yet been generated. The first Decode 4 signal sets the CCB Address Counter Gate trigger 136 (FIG. 2f) causing the clock 60 to take one cycle. The three following carriage emitter signals from AND 98 do likewise. The Line Counter 150 contents is now 15, bringing up Line Count 15 at AND 151 (FIG. 2e) which brings up the Stop pulse at AND 162 (FIG. 2f). Carriage Register Reset signal from OR 160 and single shot 161 (FIG. 2f) resets the Command Register 78 (FIG. 2l) and the Line Counter 150 (FIGS. 2d and e), and initiates the carriage stopping sequence by resetting the Low Speed latch 120. Reset of the Low Speed latch 120 (FIG. 2t) causes the mechanism to stop as previously described. The carriage has advanced four lines from 1 to 5. Carriage Control Buffer 40 has advanced from position 2 to position 6.

Assume that the command is loaded to skip to a forms channel 15 line spaces or more from the present print line. Specifically assume that the channel digit is stored in position 20 of the Carriage Control Buffer 40 and line 1 was the last line printed. In this case, a Carriage Compare signal from Carriage Compare latch 159 (FIG. 2f) will not occur during 15 initial advances of the Line Counter 150. When the Line Counter 150 (FIGS. 2d–e) reaches a count of 15, inverter 153 (FIG. 2e) inhibits further advance of the Line Counter 150. In each of the 15 clock pulses the CCB Address Register 56 was advanced so that the CCB Address is 16 line spaces ahead of the actual forms line. The first and successive Decode 4 pulses from the decode circuit 132a (FIG. 2r) will force additional stepping of the CCB Address Register 56 (FIGS. 2d–e) until a Carriage Register Compare occurs at AND 77c (FIG. 2l), at CCB Address 20, turning on Carriage Compare latch 159 at W0 time through AND 113 and OR 117 (FIG. 2f). Further advance of the CCB Address Register 56 (FIGS. 2d–e) is inhibited when Buffer Control latch 80 (FIG. 2f) is gated down after reset of CCB Address Counter Gate trigger 136 at W1 time after compare by RO through AND 196. Since the Buffer Control signal drives the D-C gates 56b and 56c of CCB1 trigger 56–1 (FIG. 2d), RO, which is a pulse signal applied to the A-C inputs 56d and 56e of the trigger 56–1, will also advance the CCB Address Register 56 to 21 even though RO resets Buffer Control latch 80. The Line Counter 150 is complemented to zero by the Carriage Compare signal, and carriage advance continues. Each Decode 4 signal causes the advance of the Line Counter 150 as previously described since Line Count 15 came down when the Line Counter 150 was complemented. Fifteen line spaces after Carriage Compare occurred, Line Count 15 rises at AND 151 (FIG. 2e) generating the Stop pulse at AND 162. The same stopping procedure will occur as described previously and the form 13 will stop in position 20 with the CCB Address Register 56 containing address 21.

When the Line Counter 150 initially advances to 15 without a compare, Medium and High Speed conditions were generated through AND 123a, ORs 123m and 123n and ANDs 121a and 121c which sets the Medium Speed latch 122, and the High Speed latch 124 at Decode 5 and Decode 8, respectively. Thus, for a few microseconds, carriage advance occurred in Low Speed and was then changed to a Medium Speed and finally a High Speed mode. Of course, practically no carriage motion (no more than about one line, for example) actually occurred during this short time. The High and Medium Speed modes are removed a number of lines, for example, at counts of 13 and 11, and 5 and 3 for 8 and 6 lines per inch, respectively, before the stopping point, by the reset of the High and Medium Speed latches 124 and 122 through ANDs 121d and 121b and ORs 124a and 122a in response to line counts through AND 123g or AND 123h, and OR 123p. Thus, it will be seen that a high speed skip will occur if the channel skip is to 15 or more lines spaces away or if a skip is greater than four lines at 6 lines per inch, or greater than 6 lines at 8 lines per inch. The specific skip range depends on the carriage drive velocity time characteristic. Likewise, control of the deceleration by decode of the displacement in line increments to the stopping point using the Line Counter contents can be used in other types of carriage mechanisms.

During a space or skip operation, the printer may come to the end of a form 13. When the printer is at the next to last line of a form 13, but the carriage emitter pulse indicating that the form 13 is moving to the last line has not occurred, the Carriage Address Register 56 contains the address of the last line of the form 13 and the Carriage Register 84 will contain the byte associated with the next to last line of the form 13. When the Decode 4 pulse is received for the last line of the form 13, the Carriage Register will be loaded with a byte containing the flag bit indicating the end of the document. Detection of the flag bit resets the CCB Address Register 56 through AND 175 and OR 174. This is a D-C reset and occurs at RO, overriding the CCB Address Register advance which normally occurs at RO. When the clock 60 stops at RO, the CCB Address is 1, the carriage register 83 contains a flag bit and the form 13 is at the last line and is moving. ANDs 57a and 57b decode Address 0 for providing CCB Address 0 or Flag at OR 58 (FIG. 2e), and CCB Address 1, respectively.

A Carriage Run Away latch 200 (FIG. 2d) is provided which is set through AND 202, reset through OR 201 by Carriage Go or by an input from OR 172, and provides a Run Away signal at AND 203 (FIG. 2e) if CCB address 1 occurs with the Carriage Run Away latch 200 set (inverter 205 provides a Not Carriage Runaway Signal). This senses that two channel ones occurred during the same forms command so that a complete form 13 has passed by the print line without stopping the mechanism. The parity check circuit 89 (FIG. 2k) is checked for parity every WO time on an Odd bit basis through AND 204 (FIG. 2l) and OR 204a. Normally, a carriage emitter signal should occur for every line space although the emitter pulse which occurs during stopping is not functionally necessary. The Carriage Command Register 78 may have been inadvertently loaded with a forms channel digit which was not in fact loaded into the carriage control buffer 40. This is a programming error. When the carriage is set in motion, controls will look for this valid channel in the buffer 40 but none will be found. If a complete form 13 passes by the print line as sensed by the existence of two carriage address 1 conditions in the same command, a channel code did not exist, and a Carriage Run Away condition is occurring.

In operation transistors T4, T7 and T10 are selectively turned on by their associated transistors T2–T3, T5–T6 and T8–T9, which are controlled by the ON outputs of their respective Low Speed, Medium Speed and High Speed latches 120, 122 and 124 (FIG. 2t) depending on which of these latches are on, to provide for charging capacitor C at a rate corresponding to the particular speed mode in which the tractor motor 22 is operating. If in the Low Speed mode, only latch 120 will be on, and the capacitor C will charge at a rate corresponding to 25 inches per second. Since the discharge transistor T1 provides a discharge rate proportional to the feed roll speed of 38 inches per second, no charge will accumulate on capacitor C.

However, should the forms tractor be operating in the High Speed mode, the Low, Medium and High speed latches 120, 122 and 124 will be turned on, and transistors T2, T5 and T8 (FIG. 14) will be turned on, switching transistors T4, T7 and T10 to provide additional charging current to capacitor C, so that a charge will build up. Should the tractor motor 22 operate in the High Speed mode for a sufficiently long enough time for an excess of form 13 to accumulate between the tractors 19 and the stacker feed rolls 6, 8 for a form jam to become imminent, a sufficient charge will accumulate on capacitor C to raise its voltage to a level back bias T11 and switch the control from transistor T11 to transistor T12. This drops the level at the base of transistor T13 through resistor R19, switching transistor T13 off, and reverse biases the base of transistor T14, turning it off and raising the output level at line 215. This sets the Speed Limit latch 212 (FIG. 2t) through AND 216 with the next Motor Advance pulse and resets the High Speed latch 124 so that the tractor motor 22 operates in the Medium Speed mode, preventing any further queuing of the forms 13.

If instead of operating with only the High Speed mode form feed faster than the stacking rate, the Medium Speed mode form feed should also be in excess of the stacking rate, it may be desirable to reset not only the High Speed latch 124, but also the Medium Speed latch 122. This can be readily accomplished by using the output of the Speed Limit latch 212 to reset the Medium Speed latch 122 also. It may be desirable when doing so to gate the output of the Speed Limit latch 212 to reset of the Medium Speed latch 122 with the output of the Medium Speed Emitter head 106 through amplifier 108c, single shot 109b, and AND 110f, to insure a smoother transition between the High and Low Speed modes.

From the above description and the accompanying drawings, it will be apparent that the present invention provides a simple and effective control for a multiple speed stepping motor drive for a printer carriage. Maximum throughput may be obtained by utilizing the different speeds in different combinations in response to different spacing conditions without the danger of a forms jam occurring. The tractor 19 is permitted to operate in the High Speed mode until a form jam is imminent whereupon the speed is automatically reduced until the danger is over.

What is claimed is:

1. The combination in a control circuit for a high speed printer of,
  a multi-speed printer form feed means feeding a continuous form through said printer,
  stacker form feed means operating at a fixed speed less than the maximum speed of said printer form feed means to feed said form away from said printer form feed means,
  speed control means including a plurality of speed control devices normally selectively operable to operate said printer form feed means at different finite speeds relative to said stacker form feed means, and
  form velocity limiter control means connected to said speed control means and responsive to a difference between the speeds of said printer form feed means and said stacker form feed means operable to selectively control said speed control means and operate said printer form feed means to reduce the speed of said printer form feed means from one finite value to a lower finite value to prevent an excess of queuing of said form between said printer form feed and said stacker form feed means.

2. A control circuit as defined in claim 1 characterized by said form velocity limiter control means comprising a capacitor having a discharge circuit connected thereto to discharge said capacitor at a rate proportional to the speed of said stacker form feed means and having a plurality of charging circuits connected thereto and to said speed control means to charge said capacitor at rates proportional to said different finite operating speeds of said printer form feed means.

3. A control circuit as defined in claim 2 characterized by said speed control devices comprising a first speed control latch connected to said printer form feed means to effect operation thereof at one finite speed and a second higher speed control latch connected to said printer form feed means to effect operation thereof at a higher speed, said first and said second latches being connected to said charging circuits to selectively effect charging of said capacitor at a first low rate and a second higher rate, and said capacitor being connected to said second higher speed latch to effect reset of said higher speed latch whenever the voltage level of said capacitor reaches a predetermined value.

References Cited

UNITED STATES PATENTS

| | | | |
|---|---|---|---|
| 2,944,651 | 7/1960 | Malcolm et al. | 197—133 |
| 3,094,261 | 6/1963 | Thompson | 197—133 X |
| 3,123,195 | 3/1964 | Hewitt et al. | 197—133 |
| 3,171,349 | 3/1965 | Kodis et al. | 101—93 |
| 3,192,854 | 7/1965 | Martin | 101—93 |
| 3,292,530 | 12/1966 | Martin | 101—93 |
| 3,312,174 | 4/1967 | Cunningham | 197—133 X |
| 3,343,131 | 9/1967 | Bloom et al. | 101—93 |
| 3,354,816 | 11/1967 | Giannuzzi | 101—93 |

ERNEST T. WRIGHT, JR., Primary Examiner